US007575622B2

(12) United States Patent
Crundwell et al.

(10) Patent No.: US 7,575,622 B2
(45) Date of Patent: Aug. 18, 2009

(54) HEAP LEACH PROCESS

(75) Inventors: Frank K. Crundwell, Parkwood (ZA); Alan E. Norton, Brackendowns (ZA)

(73) Assignee: Geobiotics LLC, Lakewood, CO (US)

( * ) Notice: Subject to any disclaimer, the term of this patent is extended or adjusted under 35 U.S.C. 154(b) by 353 days.

(21) Appl. No.: 10/528,184

(22) PCT Filed: Sep. 15, 2003

(86) PCT No.: PCT/IB03/04103

§ 371 (c)(1),
(2), (4) Date: May 31, 2005

(87) PCT Pub. No.: WO2004/027099

PCT Pub. Date: Apr. 1, 2004

(65) Prior Publication Data

US 2005/0211019 A1     Sep. 29, 2005

(30) Foreign Application Priority Data

Sep. 17, 2002   (ZA) ................. 2002/7439

(51) Int. Cl.
*C22B 3/04*   (2006.01)
(52) U.S. Cl. .................. 75/380; 75/743; 423/DIG. 6
(58) Field of Classification Search .......... 75/380, 75/743; 423/DIG. 6
See application file for complete search history.

(56) References Cited

U.S. PATENT DOCUMENTS

| 5,030,279 | A | 7/1991 | Krauth |
| 5,174,378 | A | 12/1992 | Costerton et al. |
| 5,873,927 | A | 2/1999 | Schaffner et al. |
| 6,110,253 | A * | 8/2000 | Kohr et al. ............. 75/712 |
| 6,207,443 | B1 | 3/2001 | King |

(Continued)

FOREIGN PATENT DOCUMENTS

AU       199060837       2/1991

OTHER PUBLICATIONS

MacLeod et al "Plugging of a Model Rock System by Using Starved Bacteri," Applied and Environmental Microbiology, Jun. 1988, pp. 1365-1372.*

(Continued)

*Primary Examiner*—George Wyszomierski
*Assistant Examiner*—Tima M McGuthry-Banks
(74) *Attorney, Agent, or Firm*—Darby & Darby P.C.

(57) ABSTRACT

The invention discloses a method of controlling a heap leach process through controlling an irrigation rate of a heap as a function of at least one of an aeration rate of the heap, a determination of advection at least at one predetermined point in the heap, and a determination of temperature at least at one predetermined point in the heap. Also disclosed is for the aeration to be forced and for the method to include the step of controlling the aeration rate as 10 a function of a determination of the oxidation rate of material within the heap. The invention also extends to a method for the introduction of microorganisms into the heap of material, a method for increasing the temperature of heap of material for heap leaching, a method of determining an optimum heap configuration for a bio-assisted heap leach process of an ore heap, and a method of enriching the environment of microorganisms embedded in a heap of material for bio-assisted heap leaching.

55 Claims, 31 Drawing Sheets

Illustration of operation in Example 1

U.S. PATENT DOCUMENTS

| | | | |
|---|---|---|---|
| 6,383,458 | B1 | 5/2002 | Brierley et al. |
| 6,435,769 | B2* | 8/2002 | Harrington ............ 405/129.25 |
| 6,736,877 | B2* | 5/2004 | Harlamovs et al. ............ 75/431 |
| 6,860,919 | B1* | 3/2005 | Norton et al. ................. 75/387 |
| 2006/0035356 | A1* | 2/2006 | Crundwell et al. .......... 435/168 |

OTHER PUBLICATIONS

C.L. Brierly, "Bacterial succession in bioheap leaching", Hydrometallurgy 59 (2001), pp. 249-255.

G. Zarate, et al., "The metallurgy of the Mantoverde Project", Hydrometallurgy 39 (1995) 307-319.

F.A. MacLeod et al., "Plugging of a Model Rock System by Using Starved Bacteria", Applied and Environmental Microbiology, Jun. 1988, pp. 3365-1372.

David G. Dixon, "Analysis of heat conservation during copper sulphide heap leaching", Hydrometallurgy 58 (2000) pp. 27-41.

Munoz J A et al.: "A study of hte bioleaching of a Spanish uranium ore. Part I: A review of the bacterial leaching in the treatment of uranium ores"; Hydrometallurgy, Elsevier Scientific Publishing Cy. Amsterdam, NL., vol. 38, No. 1, May 1, 1995, pp. 39-57, XP004040764, ISSN: 0304-386X.

Boon, M. and J.J Heijen. Gas-liquid mass transfer phenomena in bio-oxidation experiments of sulphide minerals. Hydrometallurgy 48(2):187-204, 1998.

Cathles, L.M. and Apps, J.A. A model of the dump leaching process that incorporates oxygen balance, heat balance, and air convection. Metallurgical Trans. vol. 6B pp. 617-624, 1975.

Brierly, J. A. and C.L. Brierley. Microbial mining using thermophilic organisms. Thermophiles: General, Molecular and Applied Microbiology. T. D. Brock. Golden, John Wiley & Sons:279-305, 1986.

Mulr, L. and Berry, V. Observations of a natural thermophilic microorganisms in the leaching of a large, experimental, copper-bearing waste body. Met.Trans. B 10B:523-531, 1979.

Moreno, L. Martinez, J., Casas, J. Modelling of bioleaching copper sulphide in heaps or dumps, In: R. Amils, A. Ballester editors, 16th International Biohydrometallurgy Symposium, IBS 99, pp. 443-451, 1999.

* cited by examiner

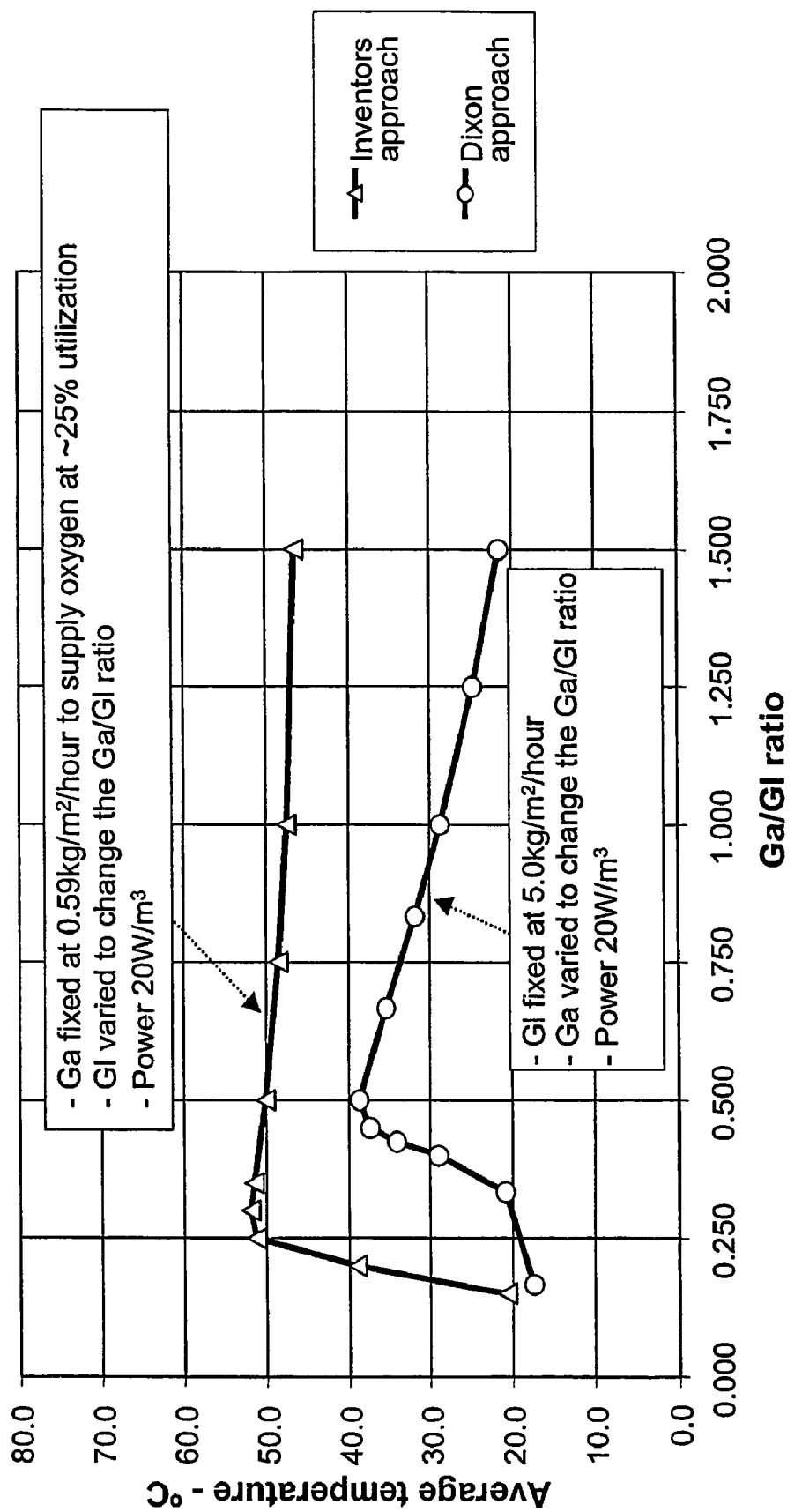
Figure 1 – Average heap temperature

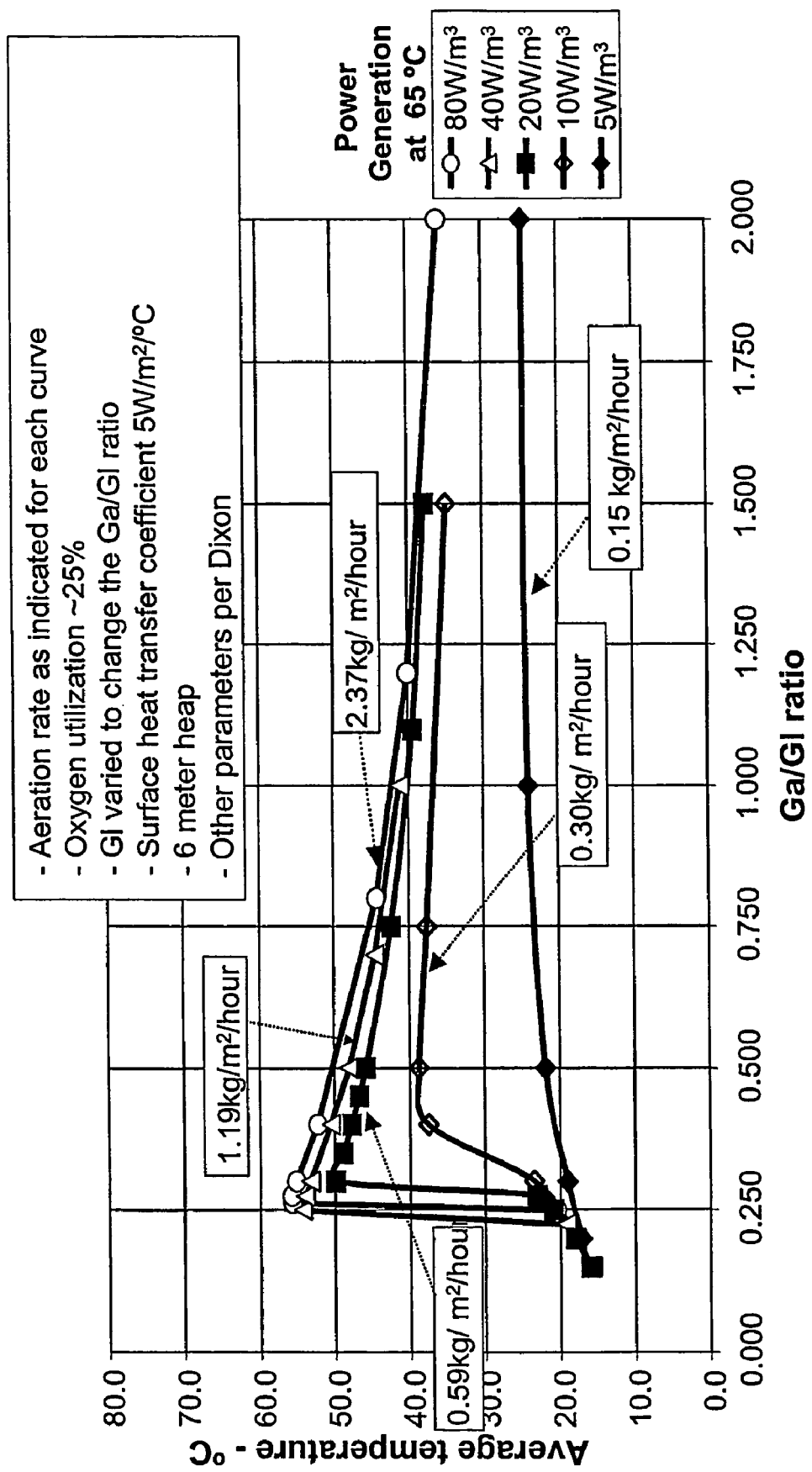
Figure 2 – Average heap temperature as a function of unit power generation

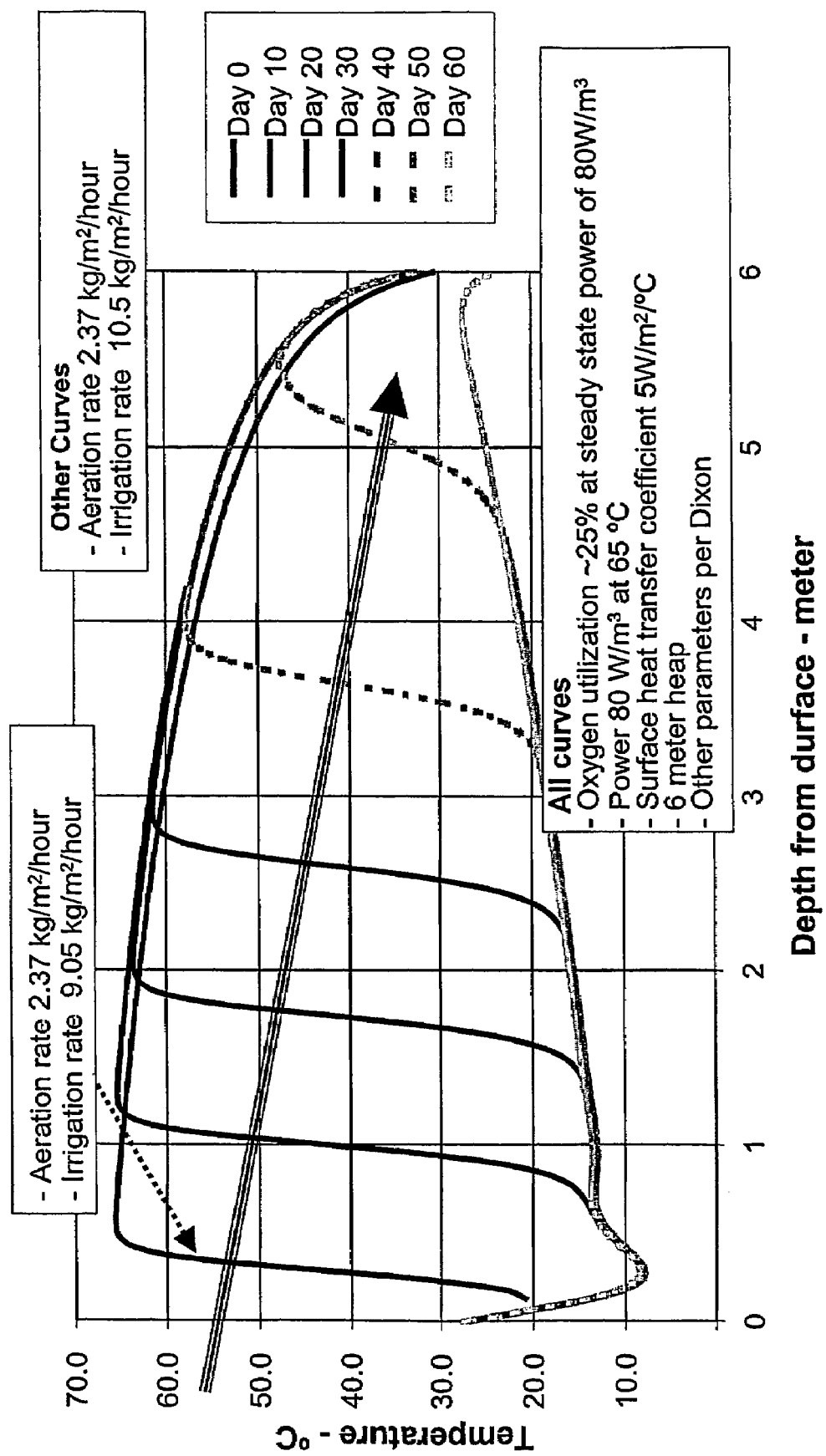
Figure 3 – Collapse of heap temperature below critical Ga/Gl ratio

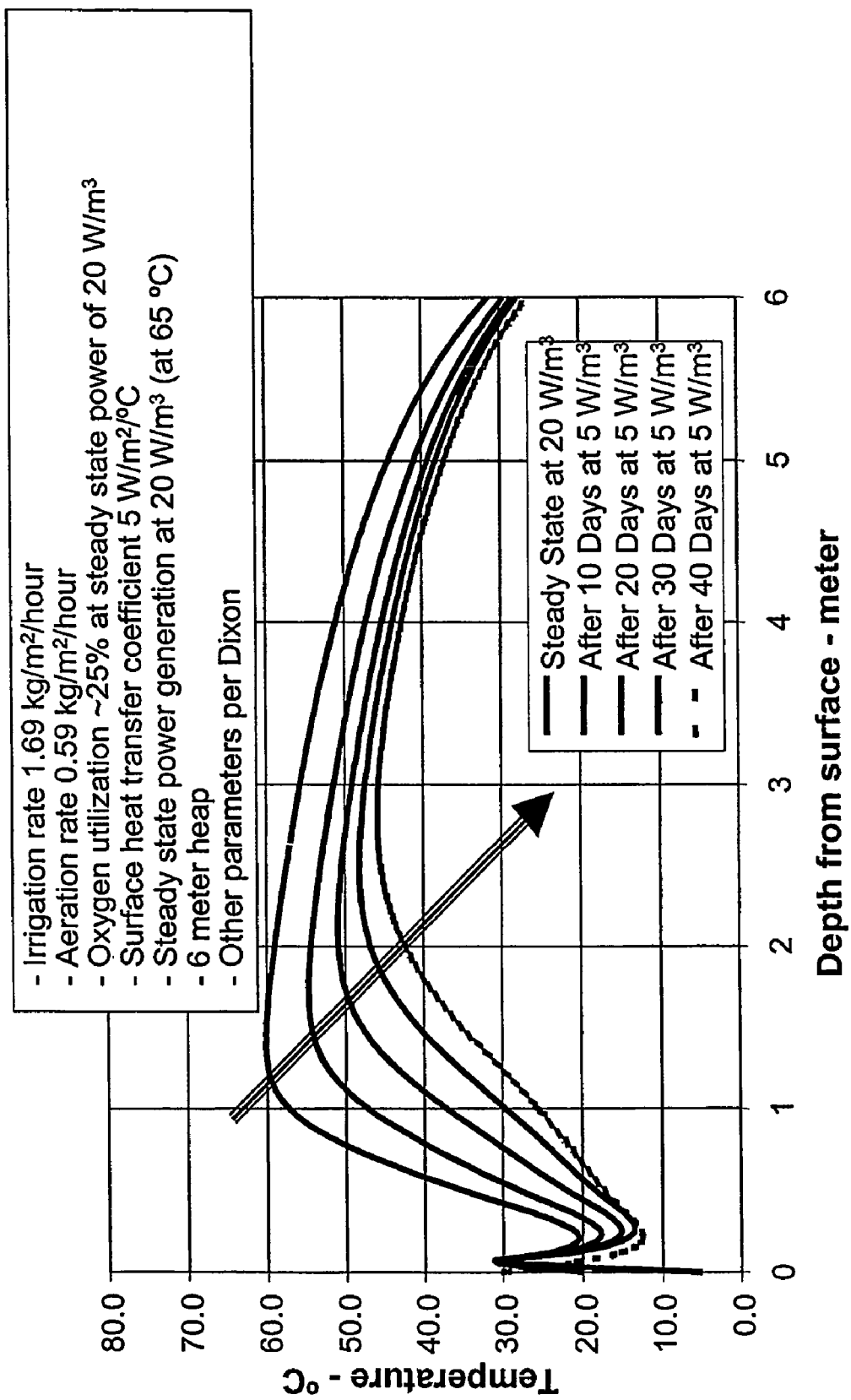
Figure 4 – Effect on steady state heap temperature profile with a step change down in power generation

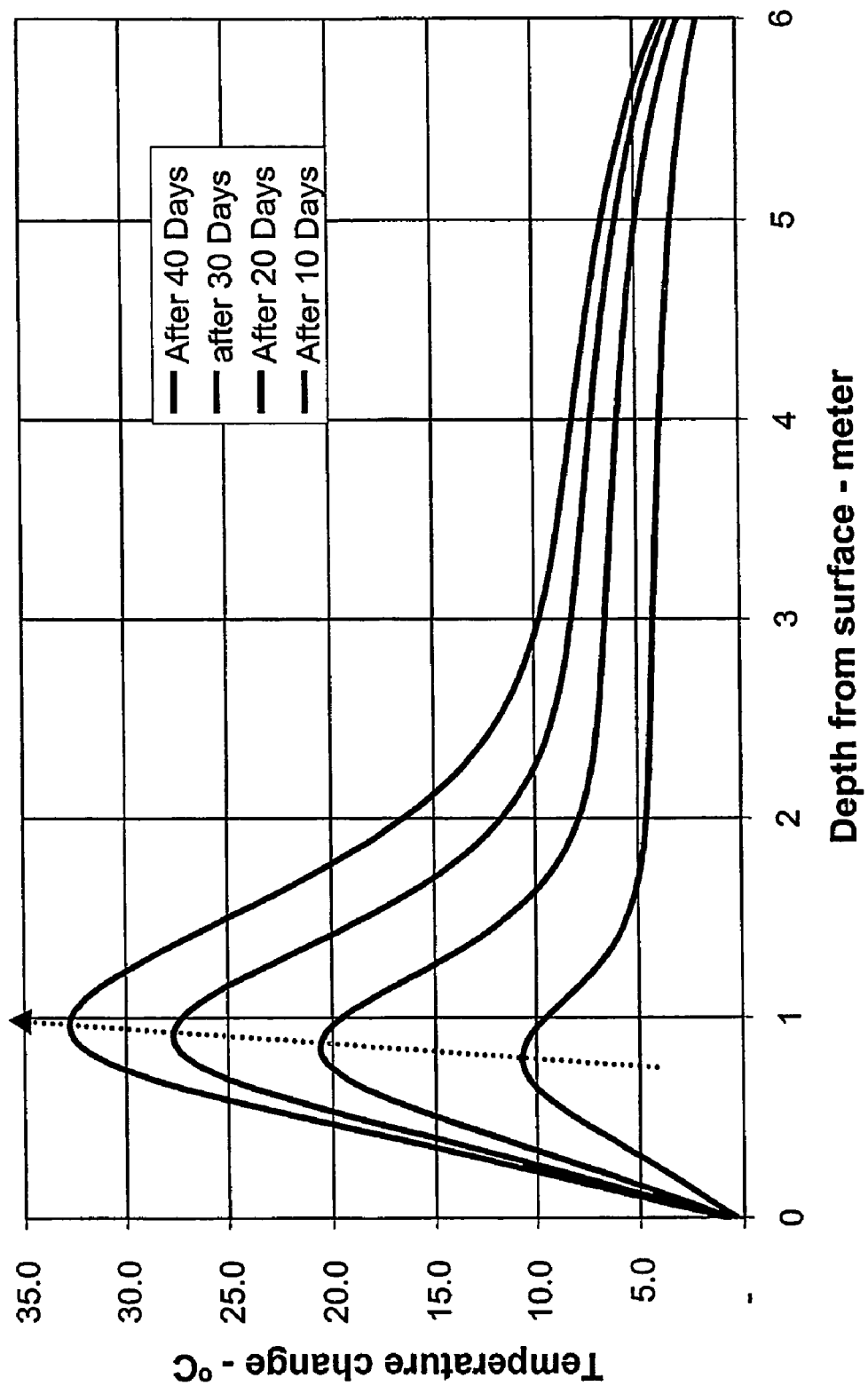
Figure 5 – Change in temperature at different depths after a step change down in power generation shown in Figure 4

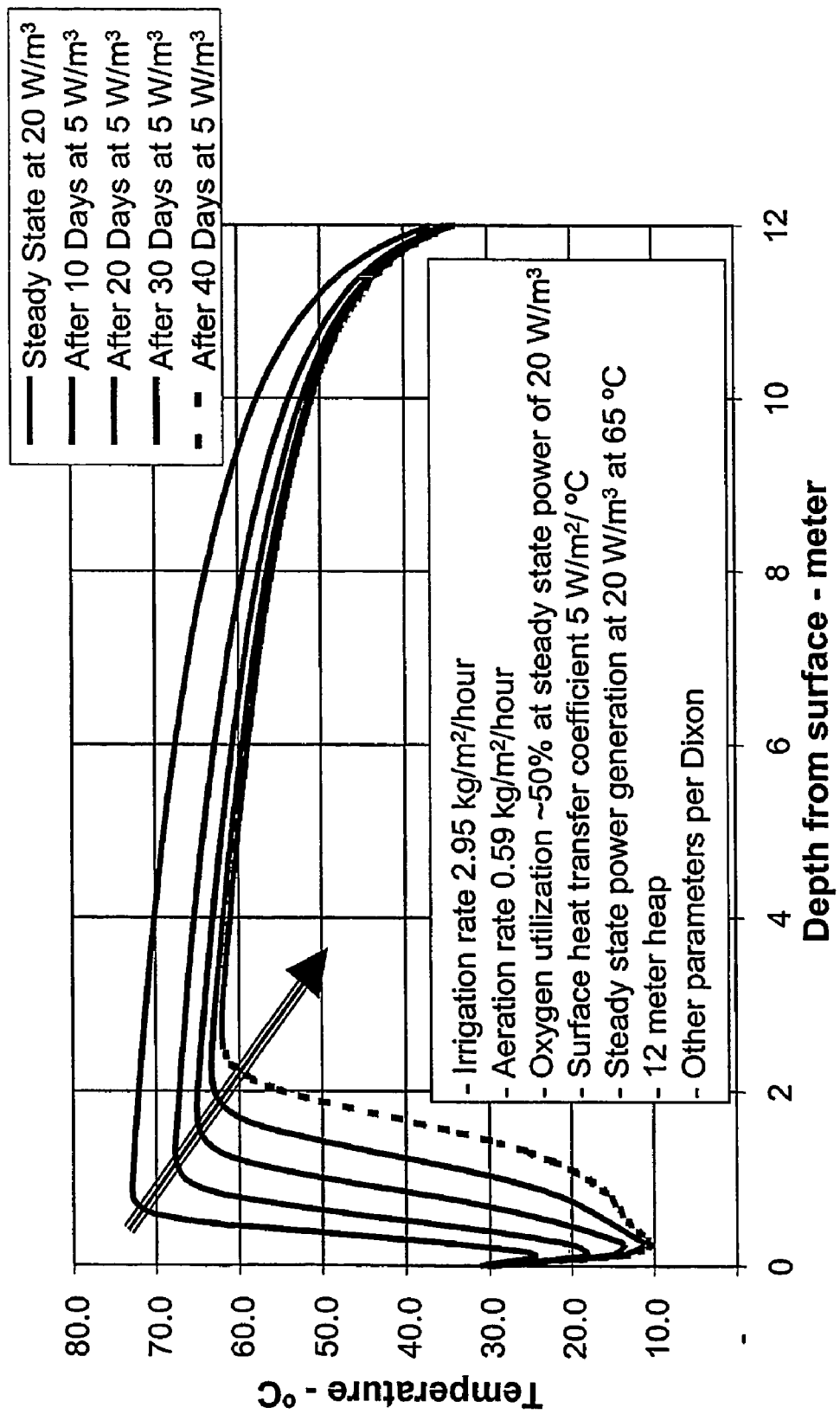
Figure 6 – Effect on steady state heap temperature profile with a step change down in power generation

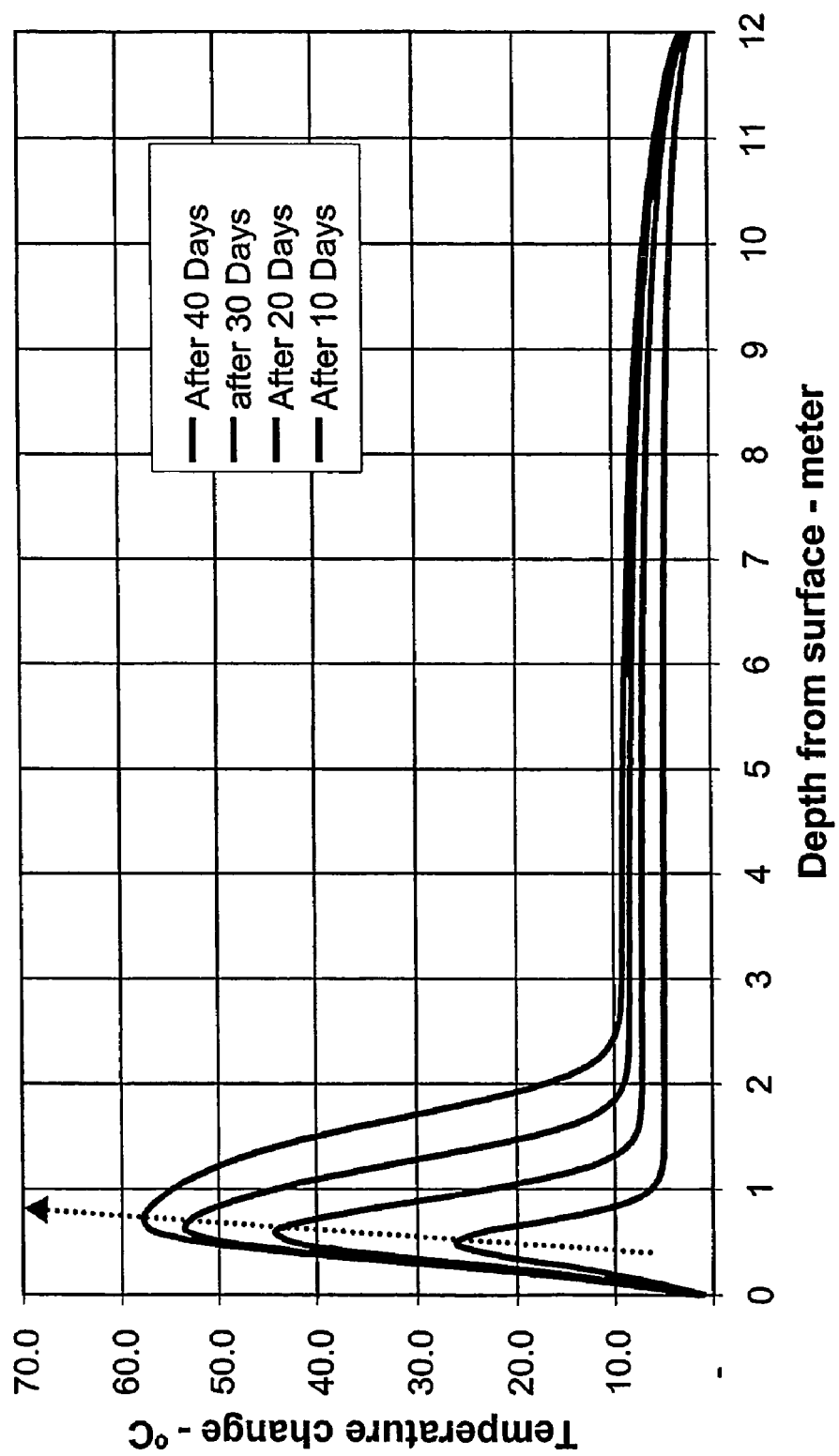

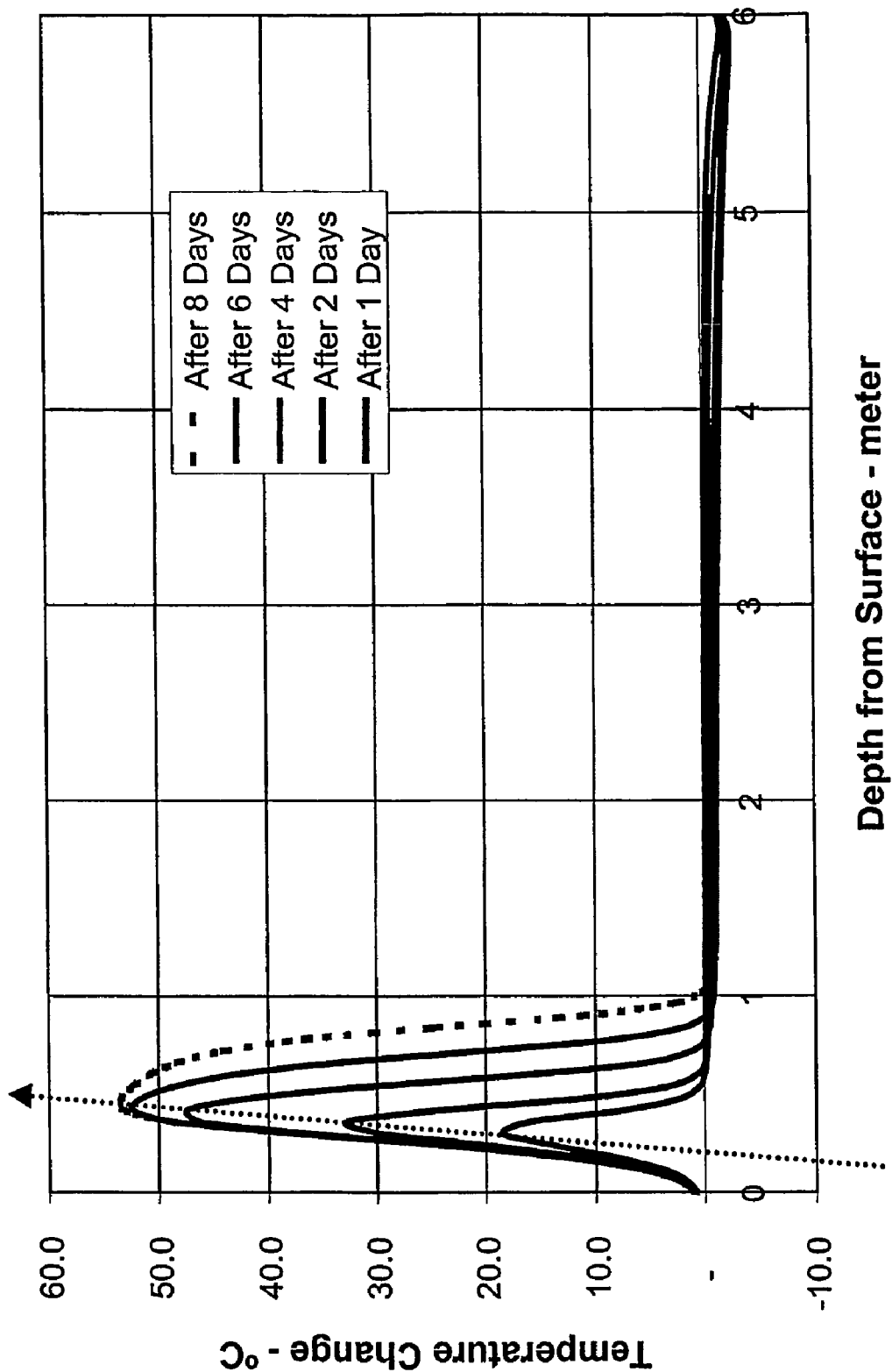

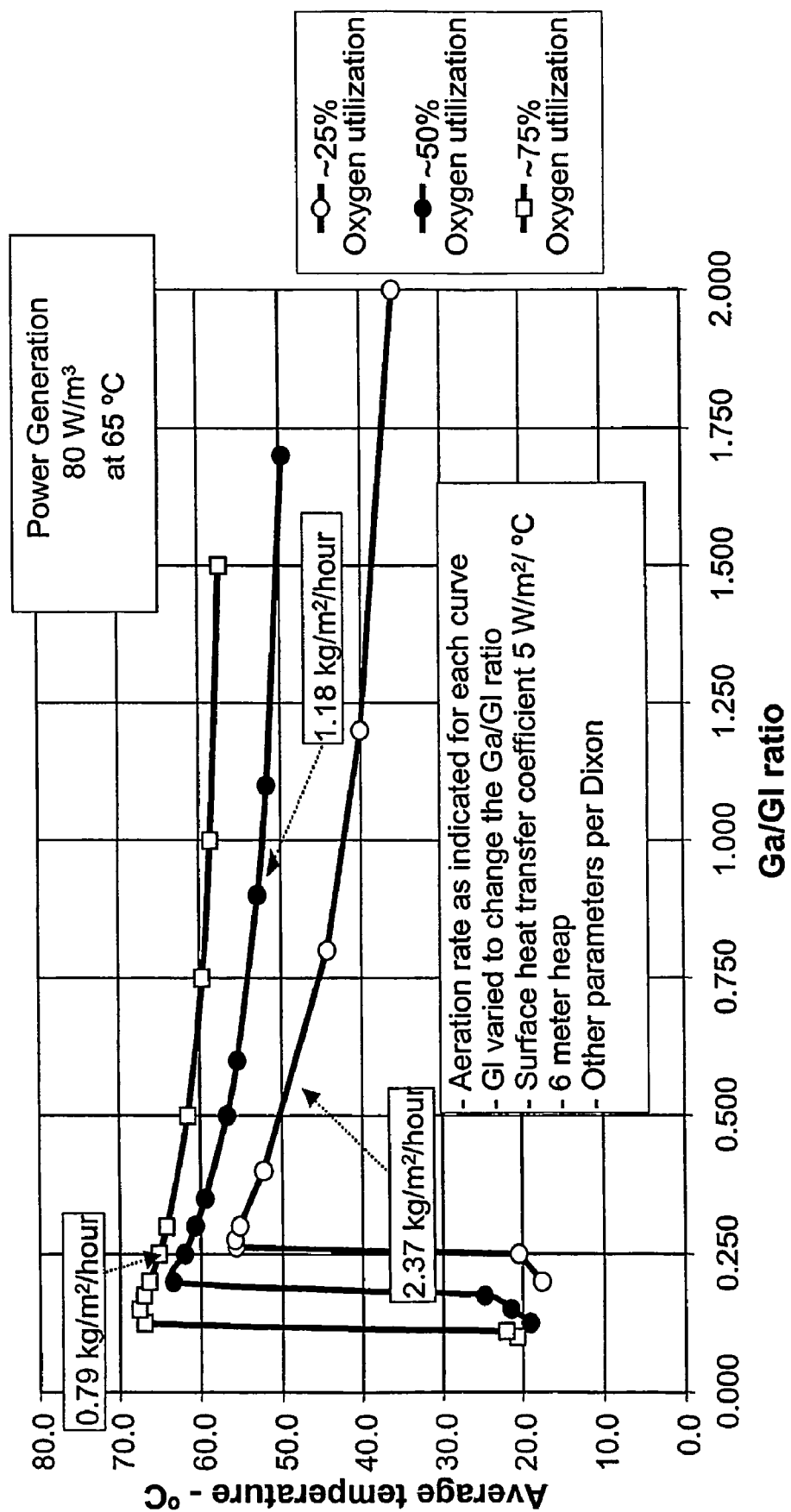
Figure 9 – Average heap temperature as a function of oxygen utilization

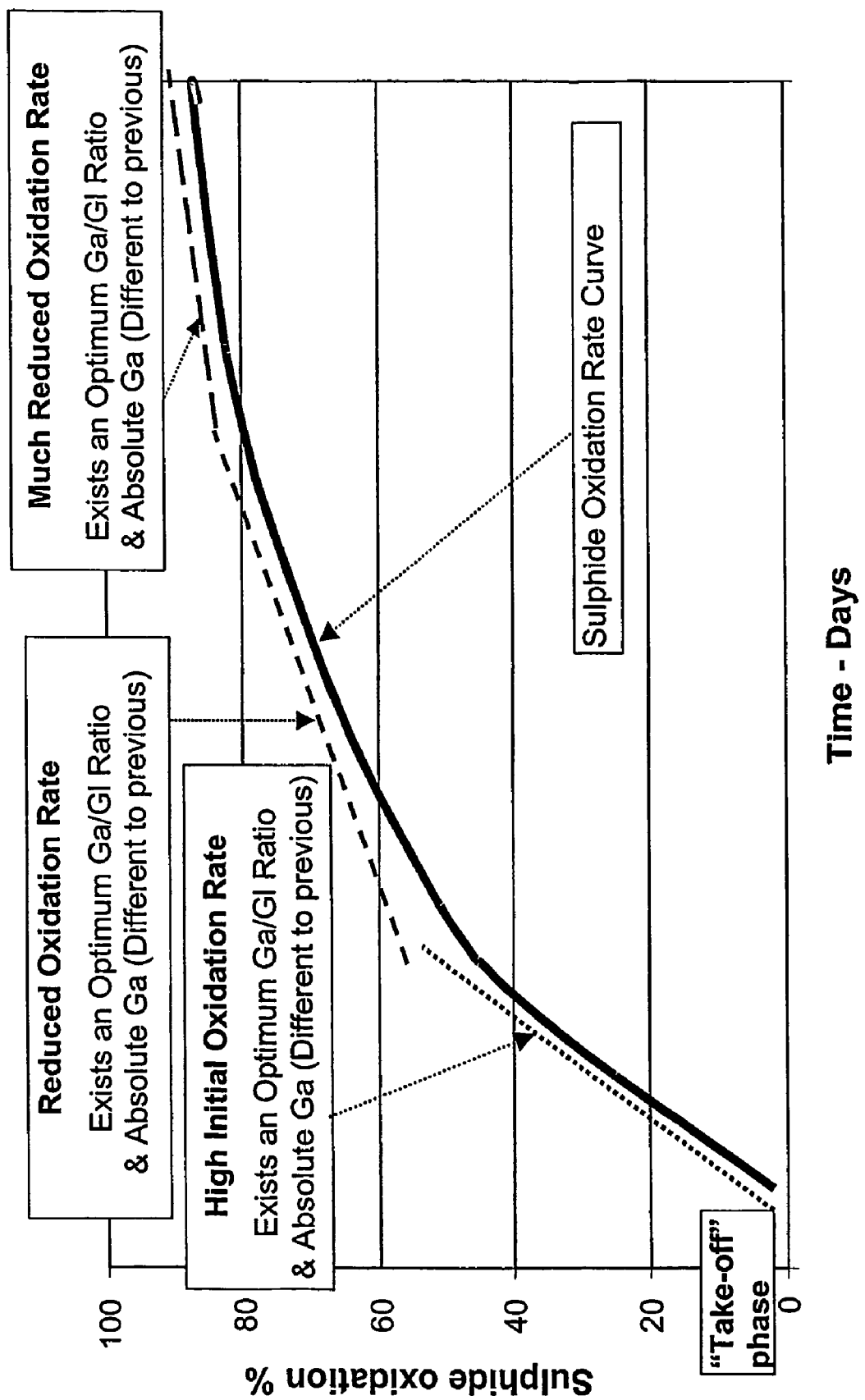
Figure 10 – Sulphide oxidation rates vary with time

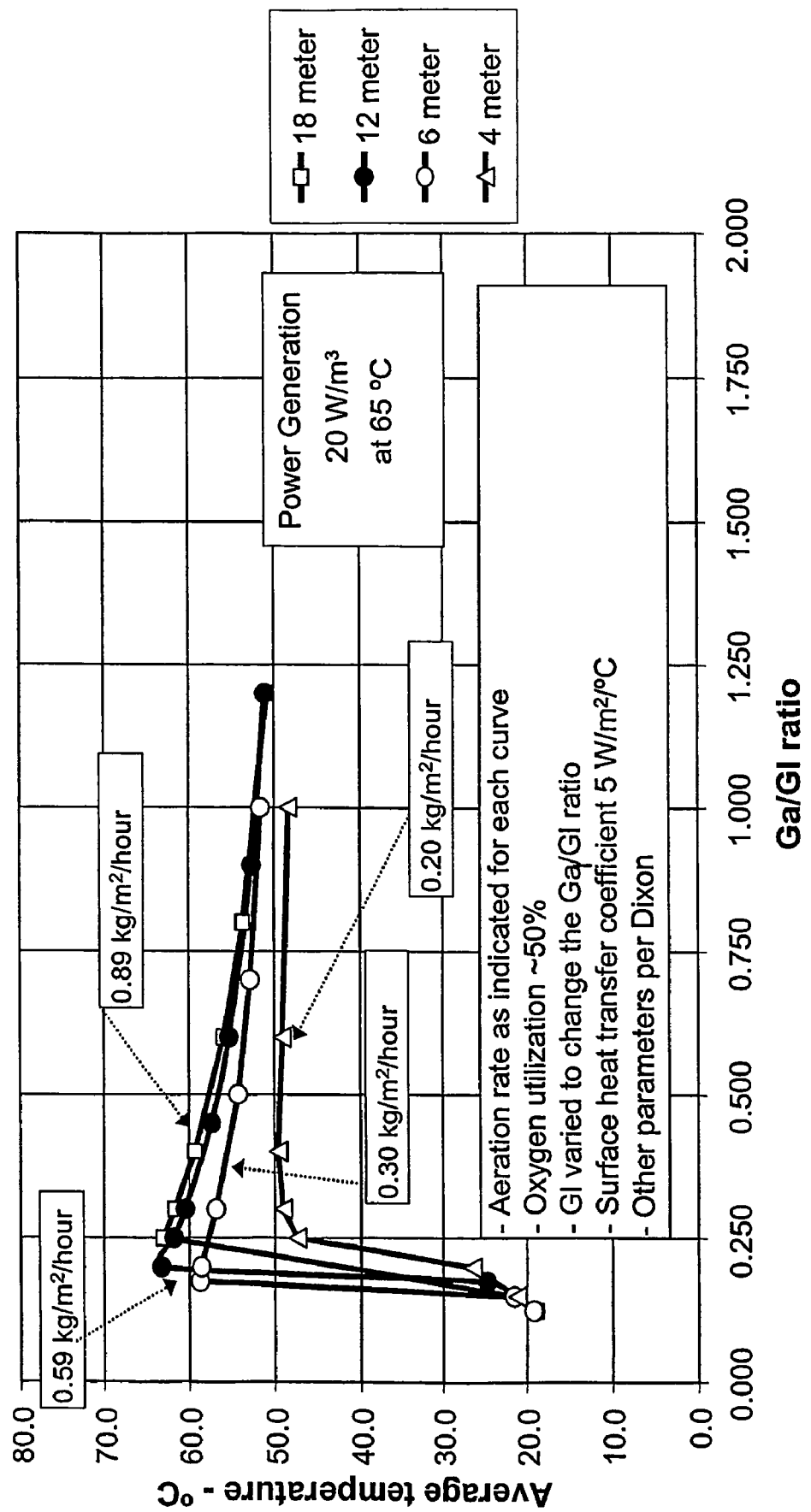
Figure 11 – Effect of heap height on average heap temperature

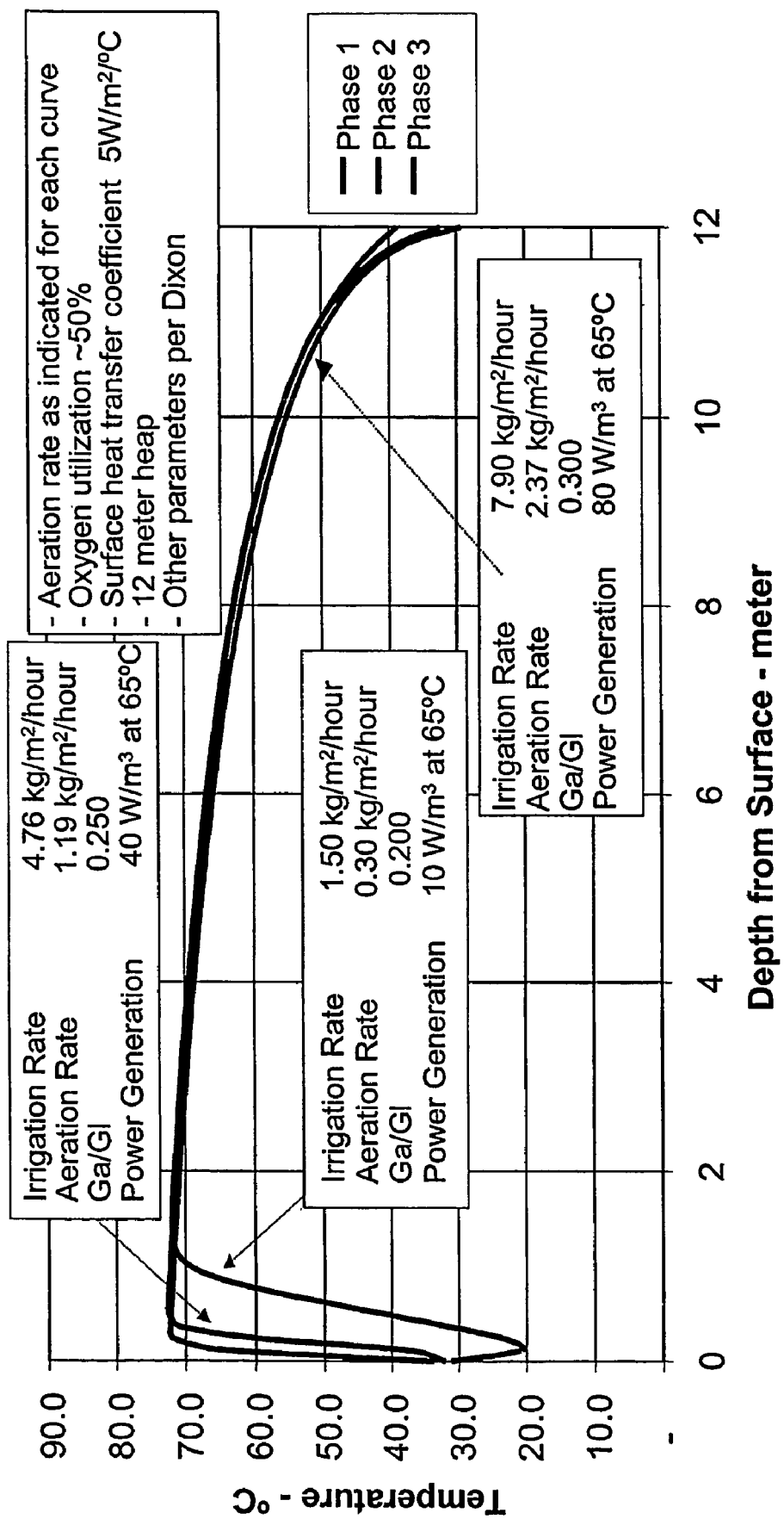
Figure 12 – Heap operating example, moderate sulphide oxidation rates

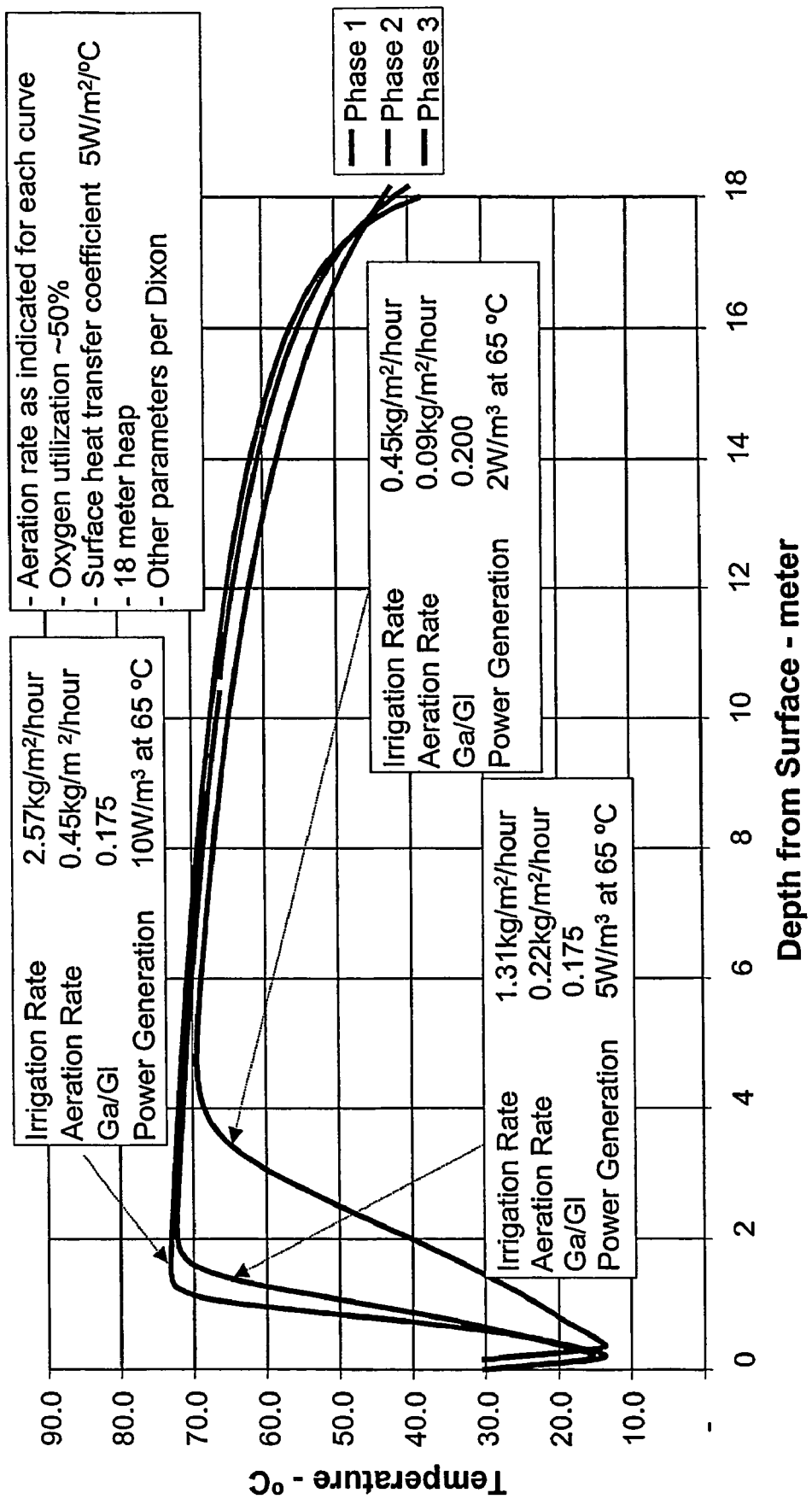
Figure 13 – Heap operating example, low sulphide oxidation rates

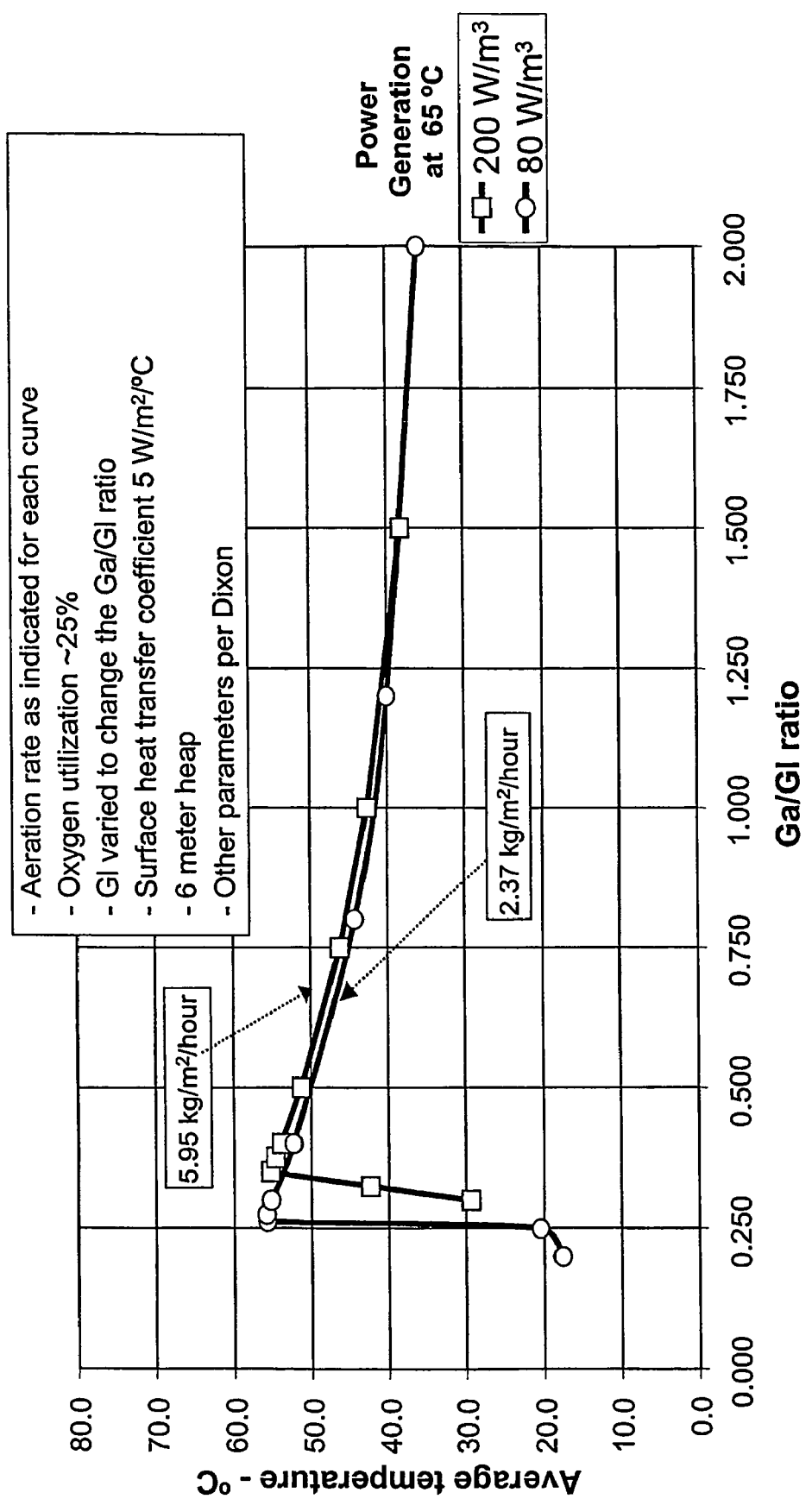
Figure 14 – Average heap temperature, high sulphide oxidation rates

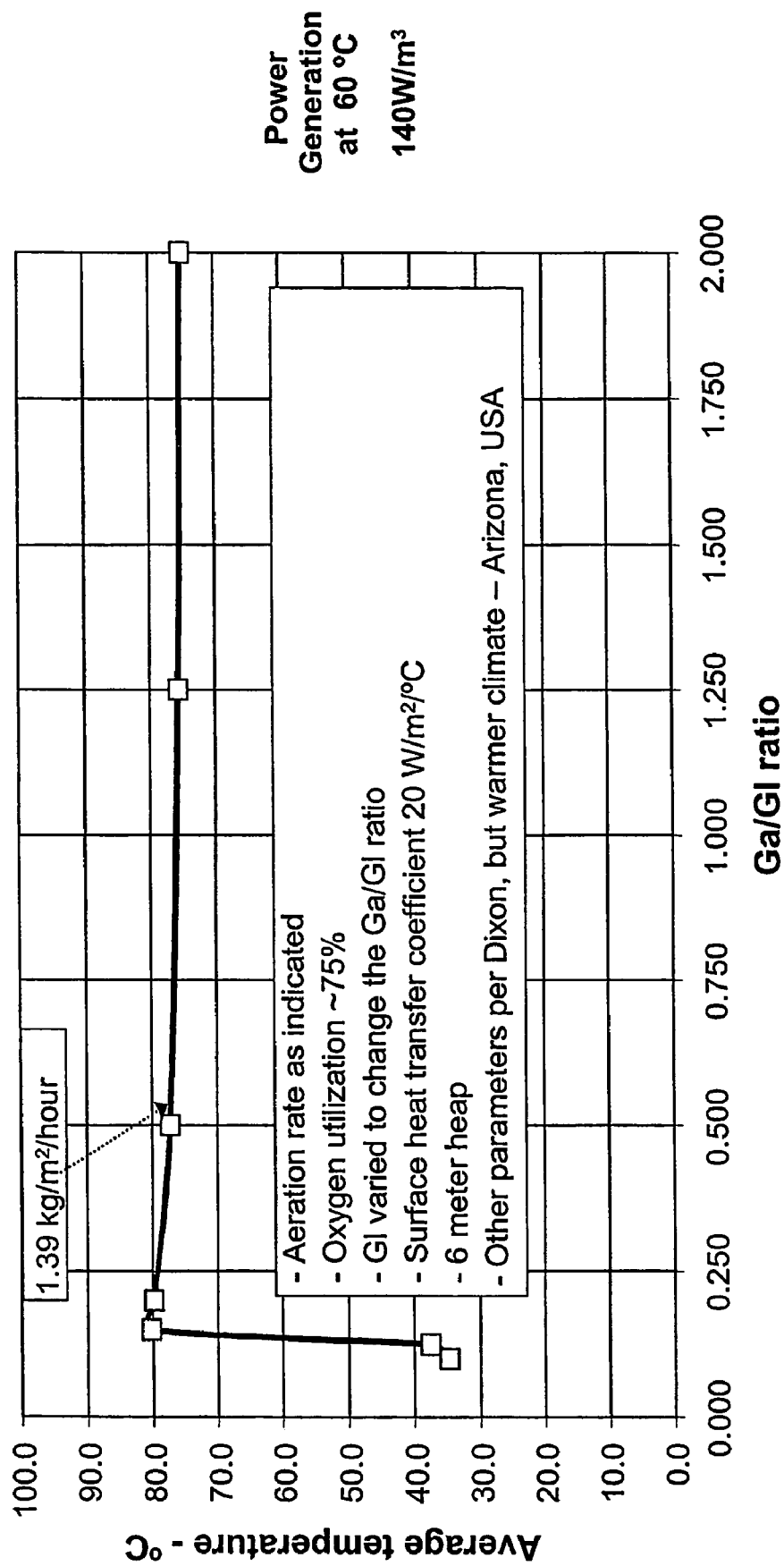
Figure 15 – Average heap temperature, 140W/m³ power generation and 75% oxygen utilization

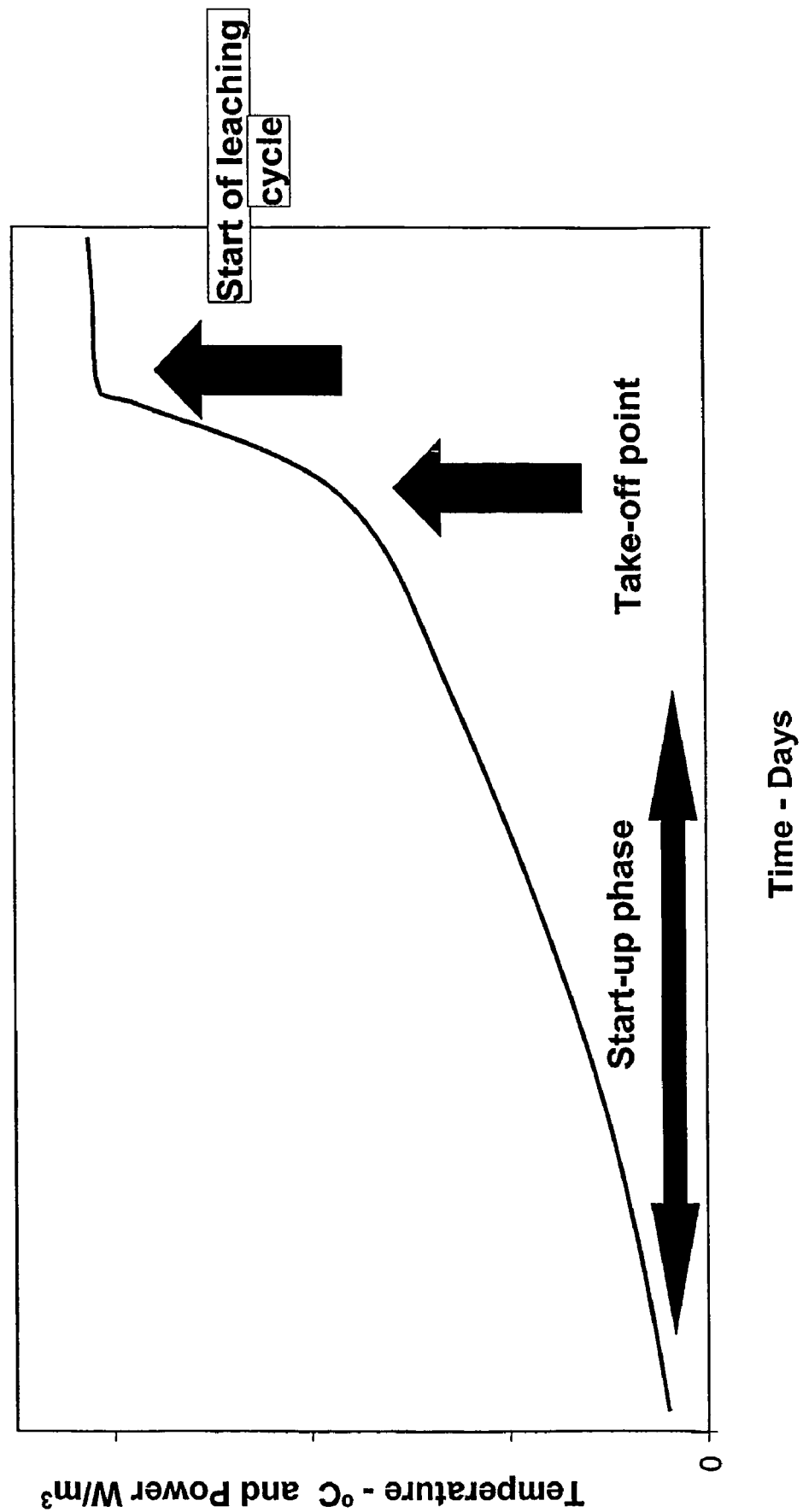
Figure 16 – Starting a heap: Getting to the take-off point

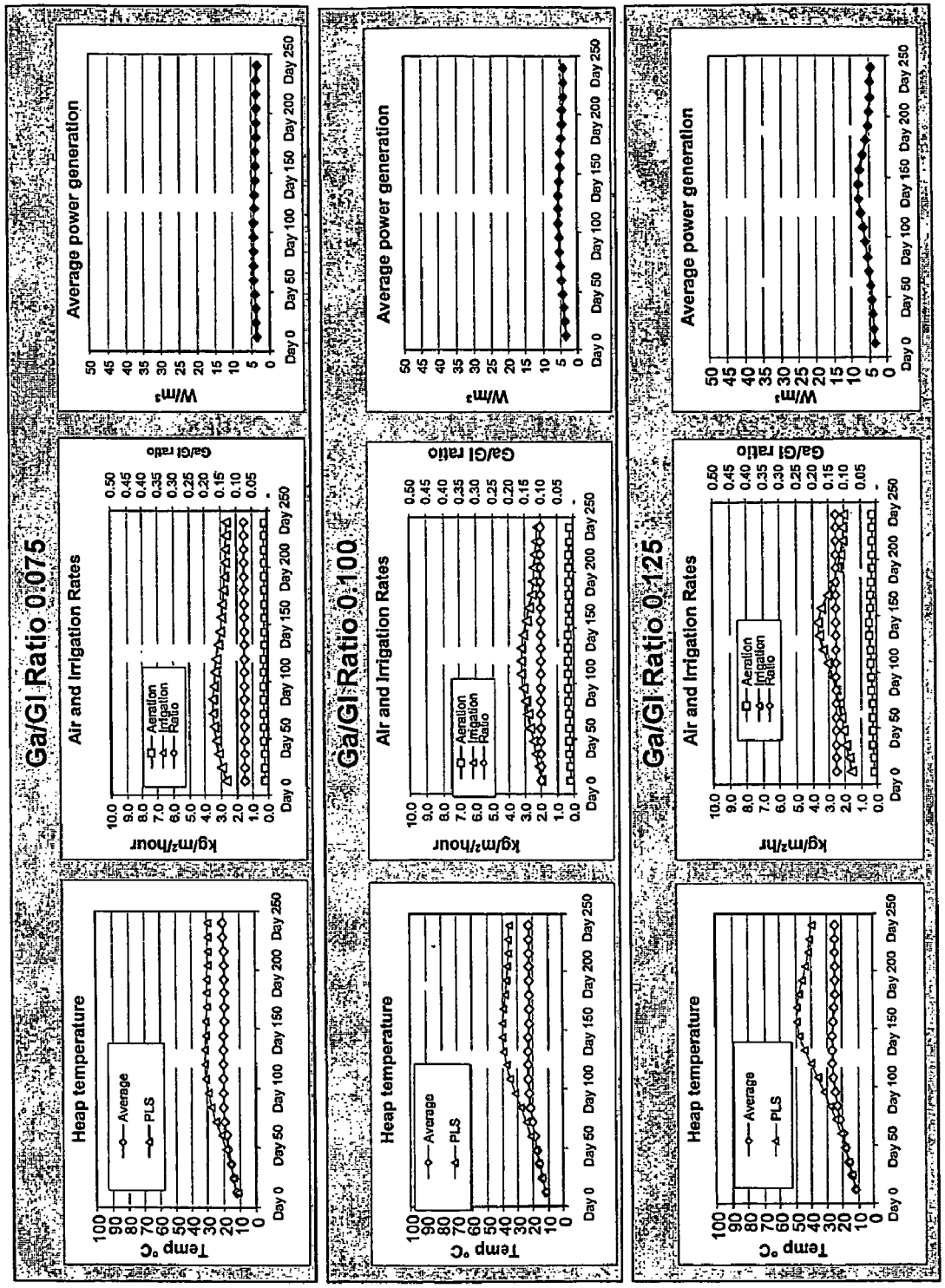
Figure 17 – Sensitivity of take-off to Ga/GI ratio in a mixed copper ore

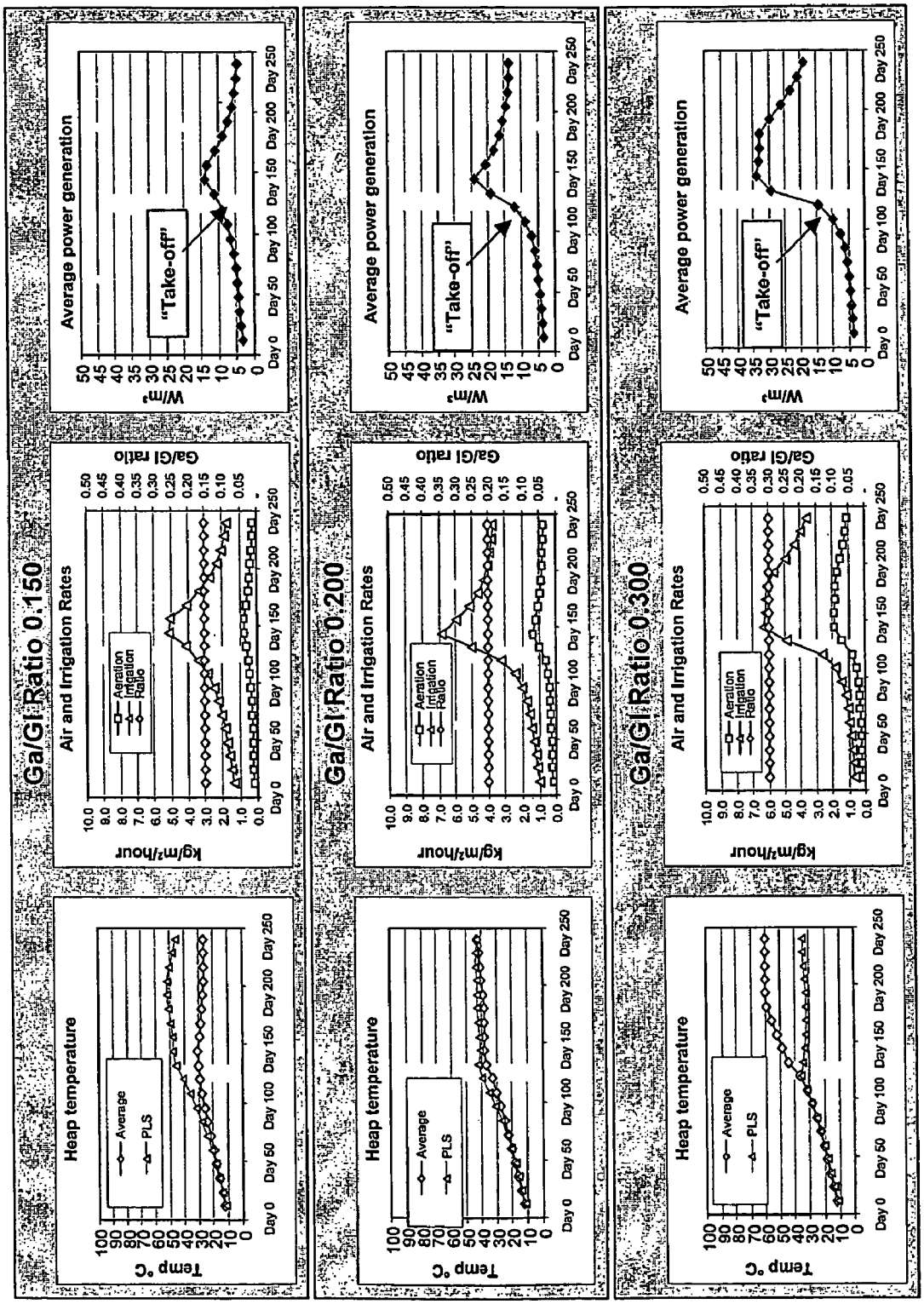
Figure 18 – Sensitivity of take-off to Ga/GI ratio in a mixed copper ore

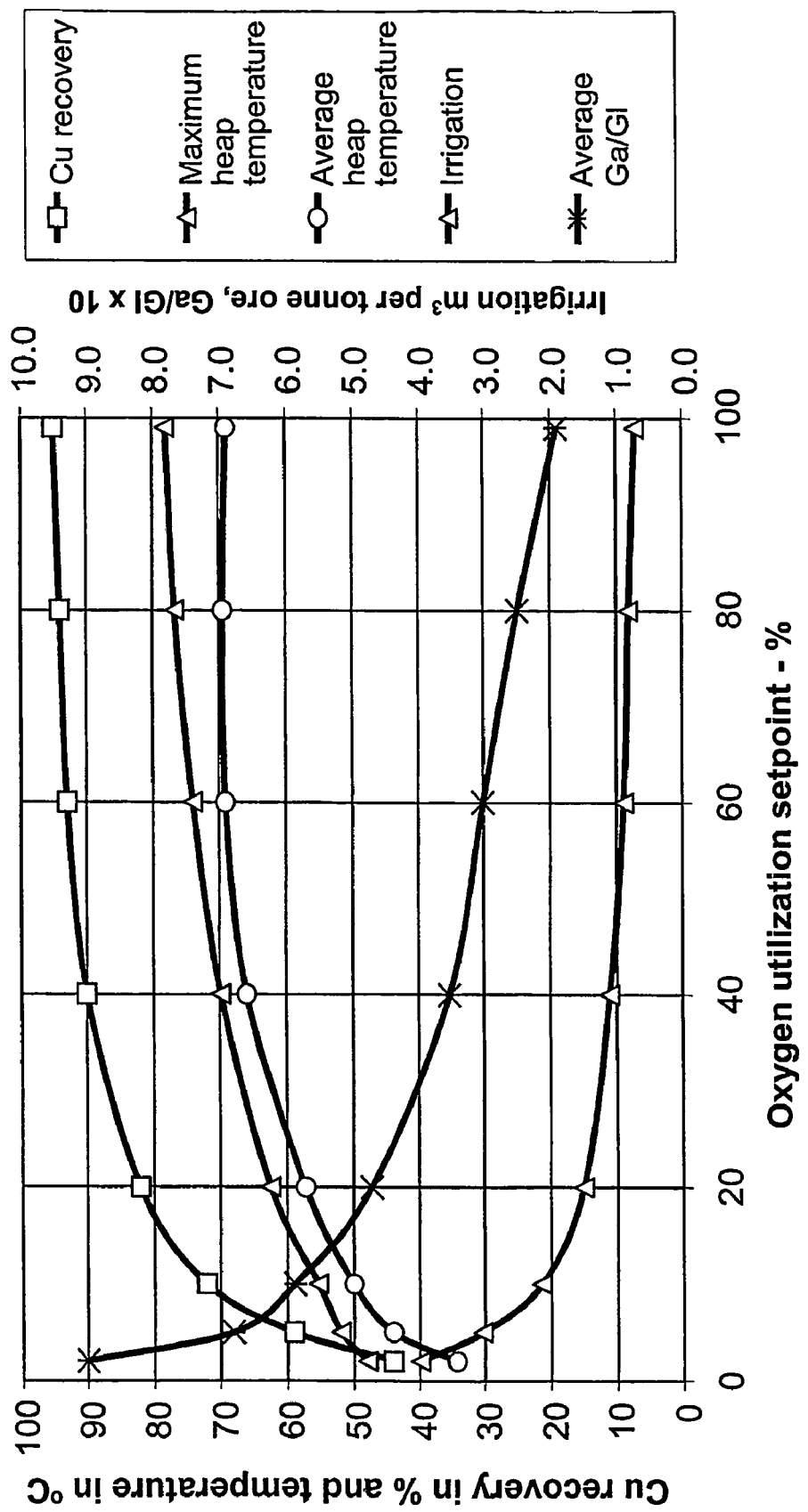
Figure 19 – Effect of oxygen utilization setpoint on Cu recovery, irrigation, Ga/Gl ratio and heap temperature

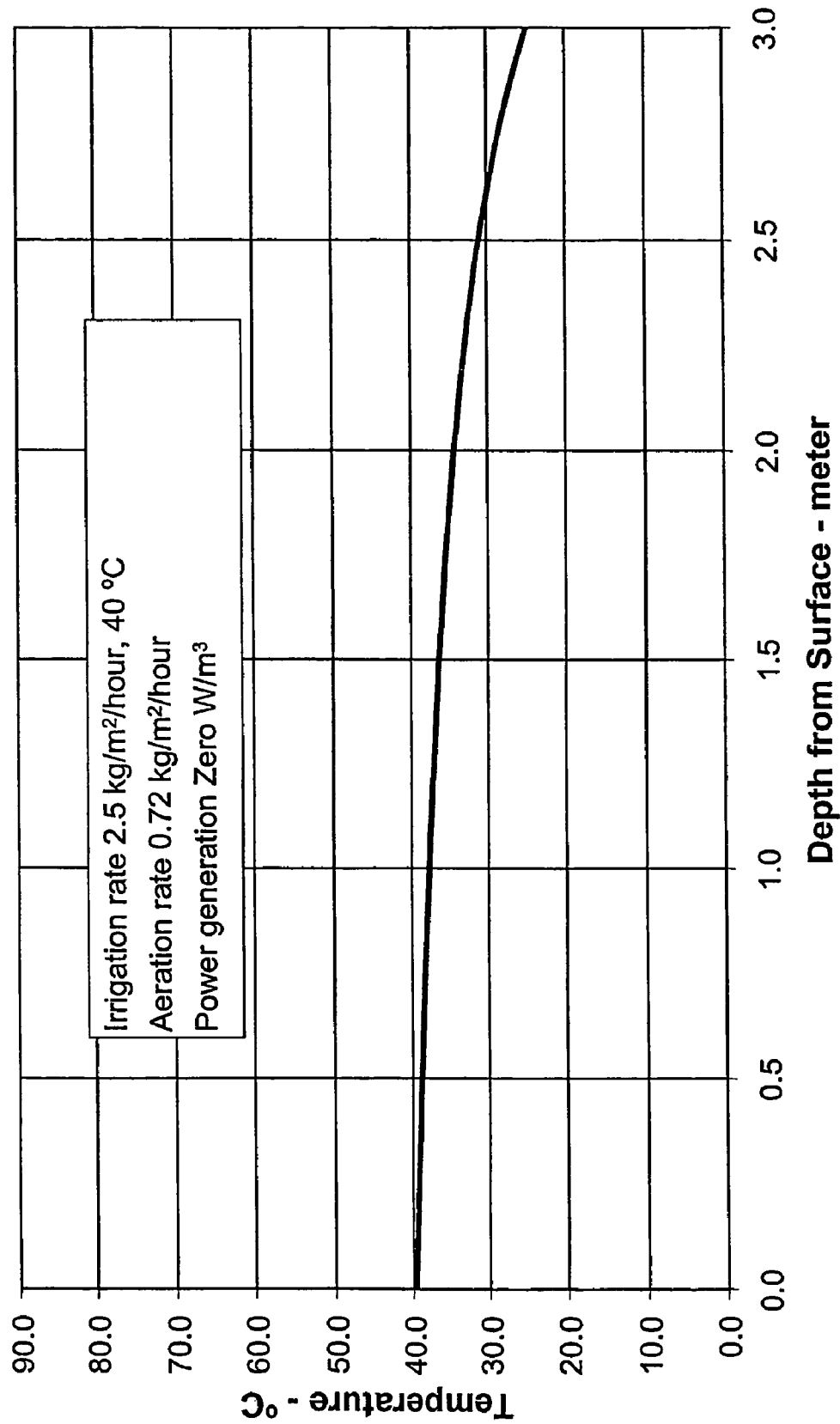
Figure 20 – Helping a heap to take-off: layer of granular material warming and humidifying air

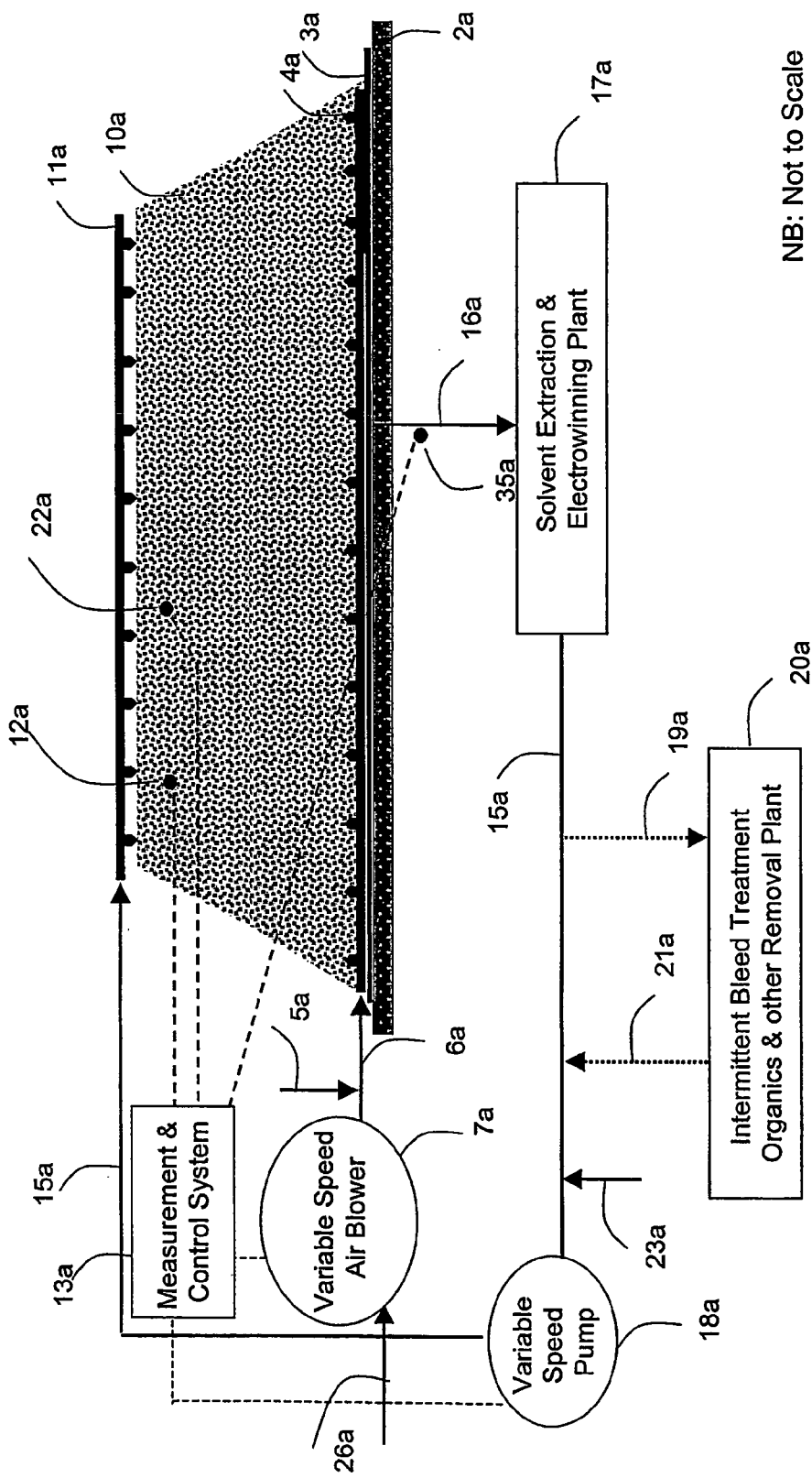
Figure 21 - Illustration of operation in Example 1

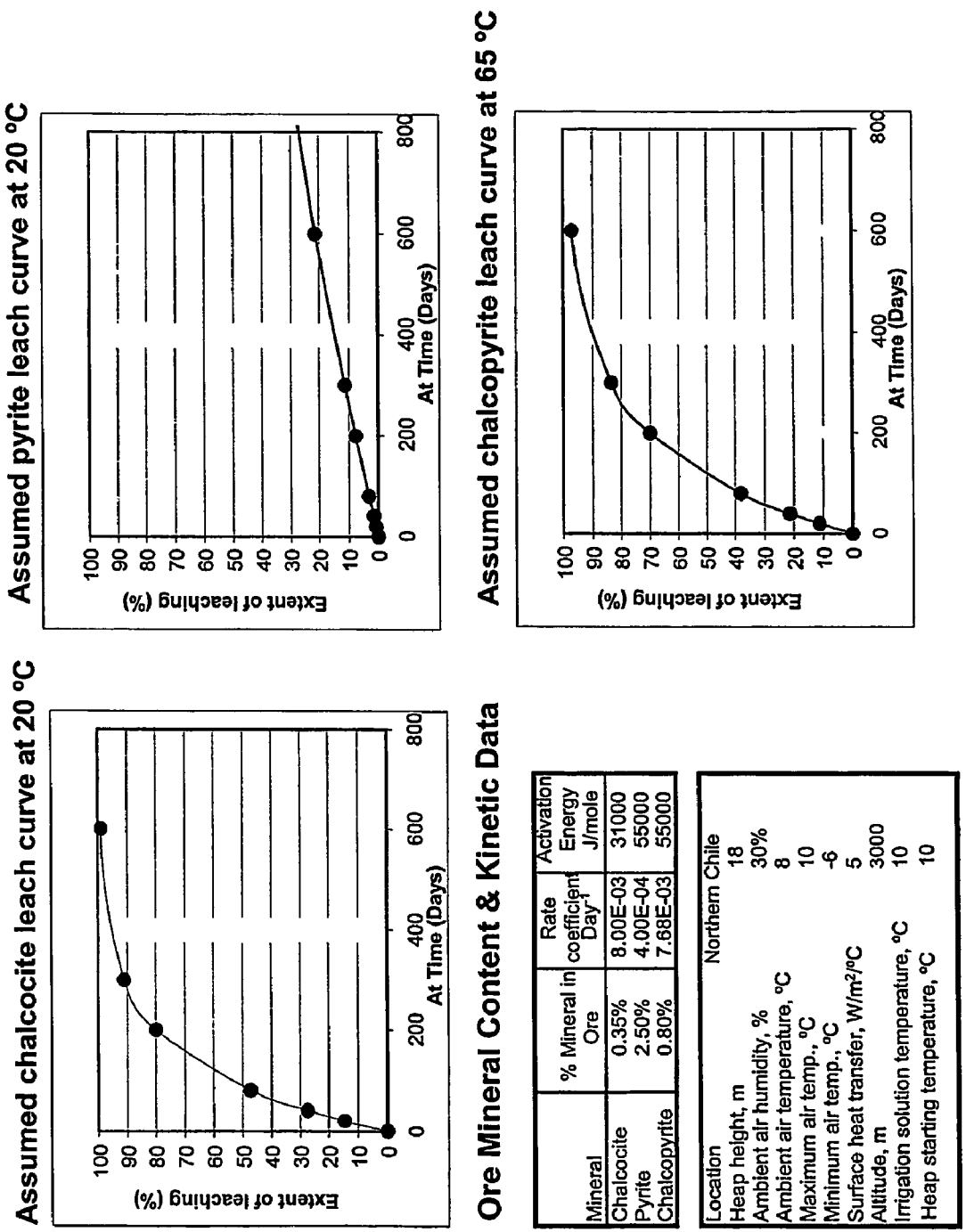
Figure 22 – Mineral leaching kinetics and other data for Example 1

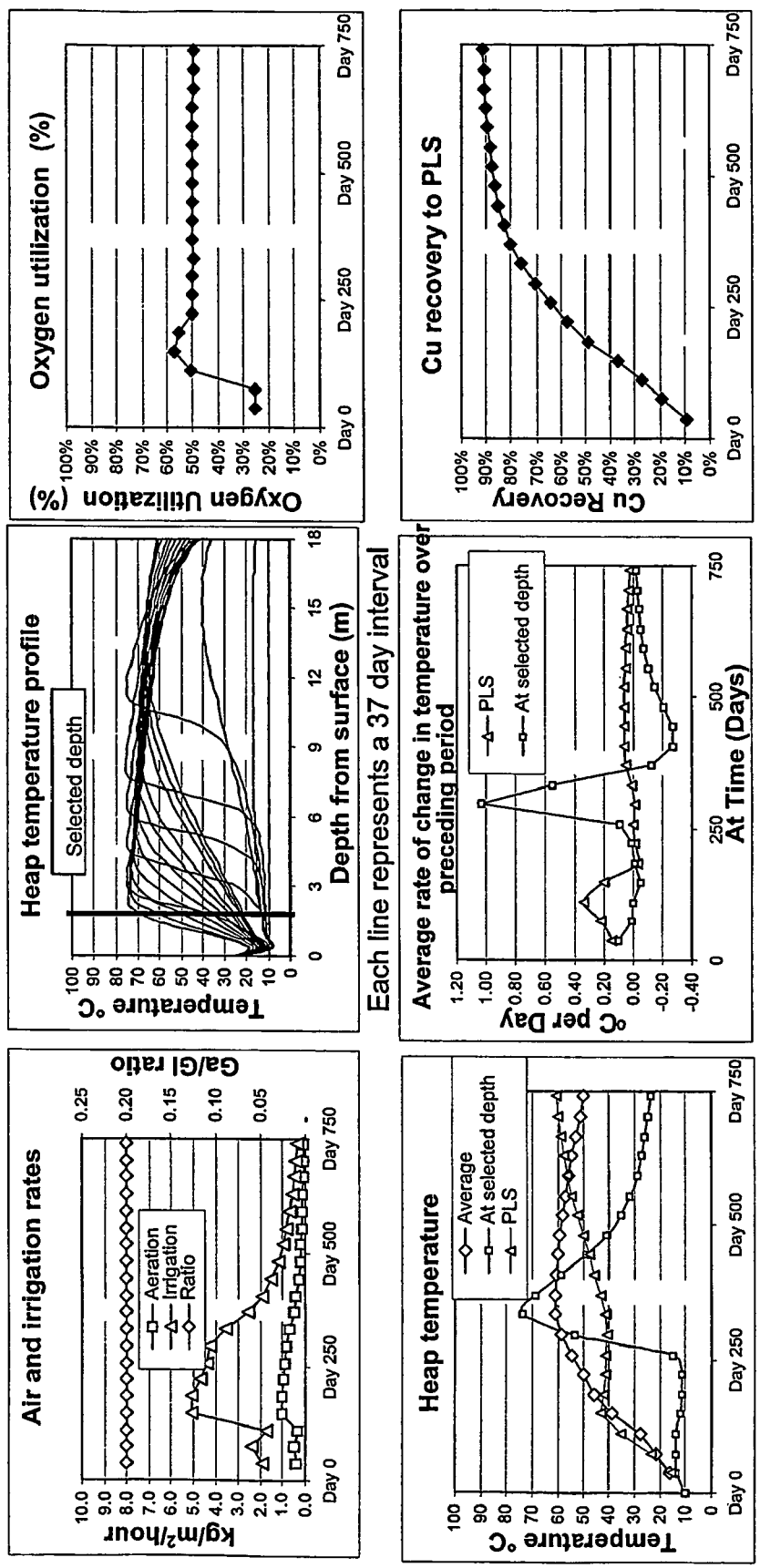
Figure 23 – Irrigation, aeration, temperature, oxygen utilization, copper recovery for Example 1

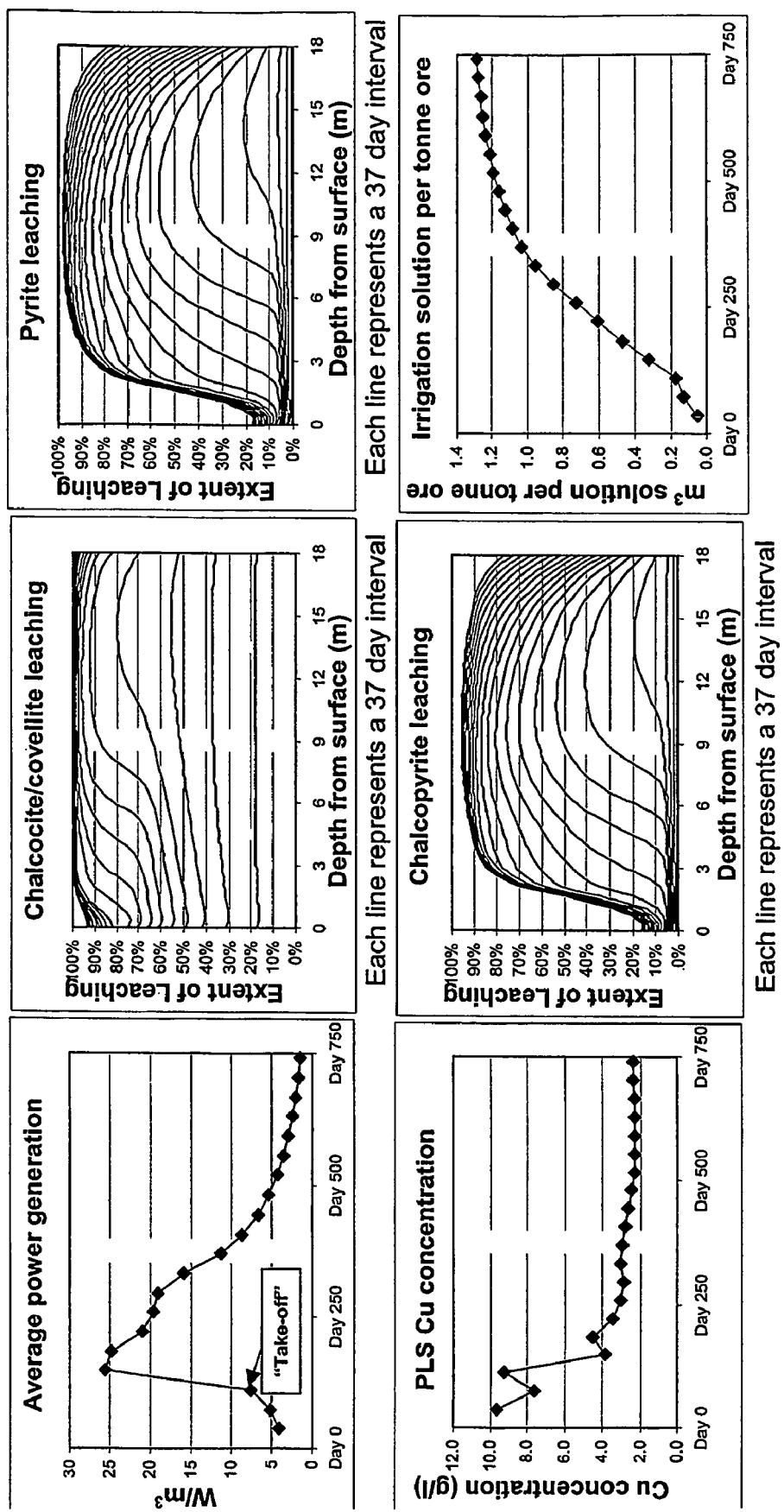
Figure 24 – Power, PLS copper, mineral leaching and irrigation application per tonne of ore for Example 1

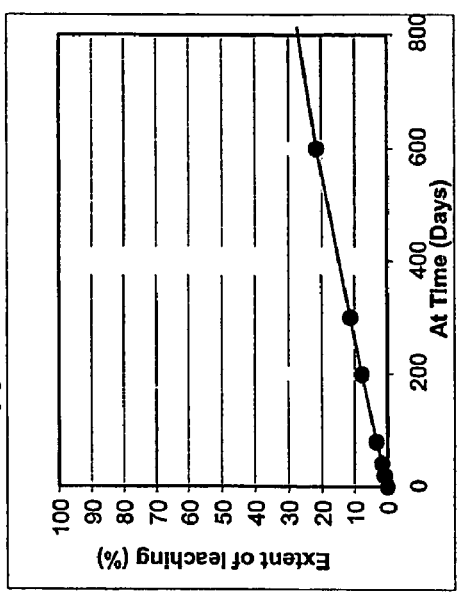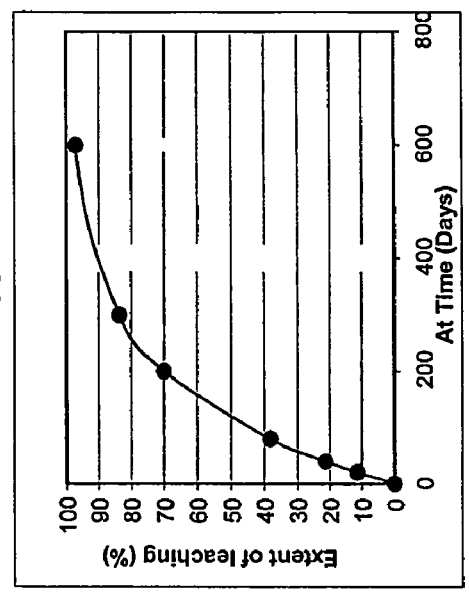
Figure 25 – Mineral leaching kinetics and other data for Example 2

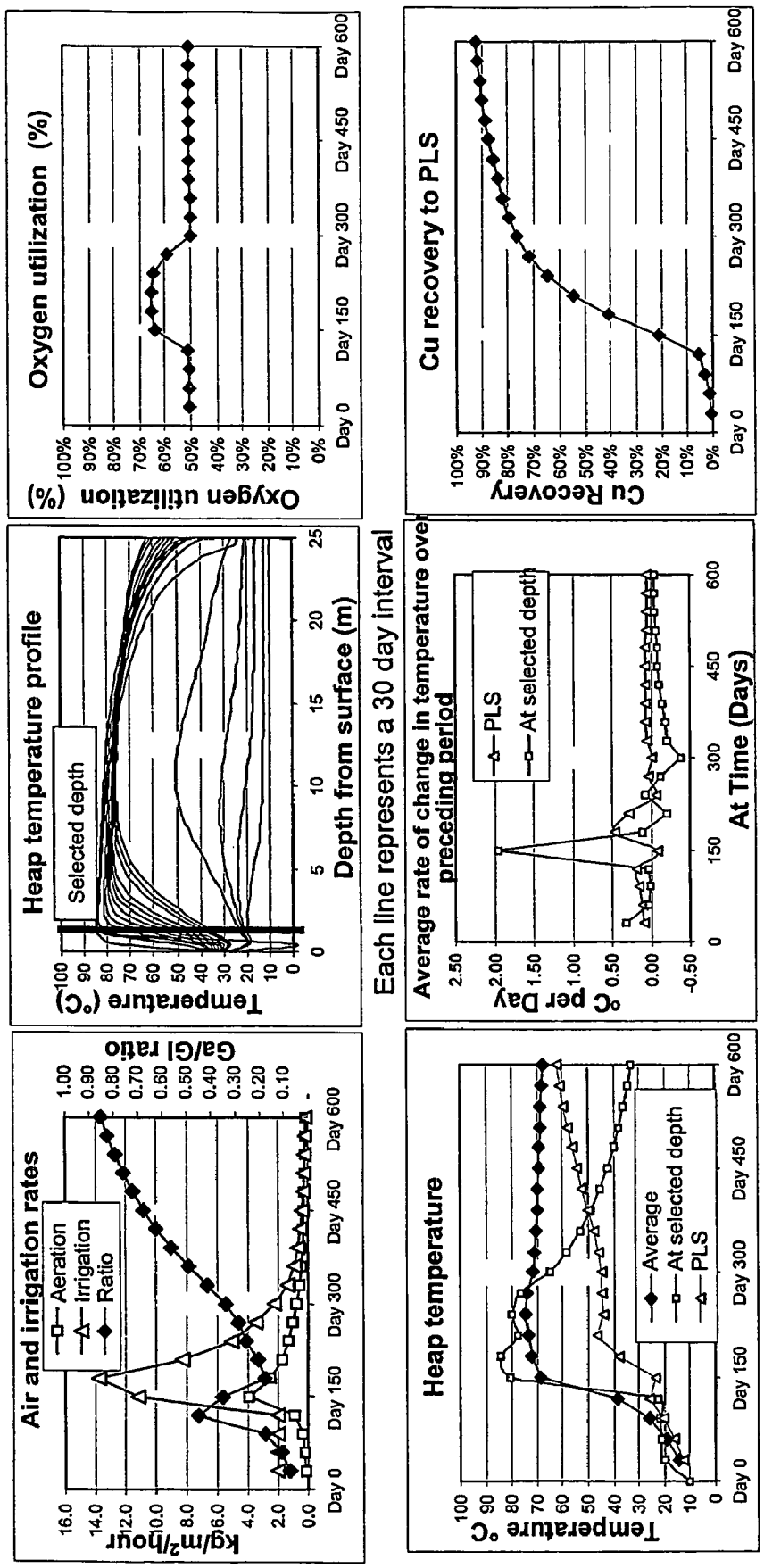
Figure 26 – Irrigation, aeration, temperature, oxygen utilization, copper recovery for Example 2

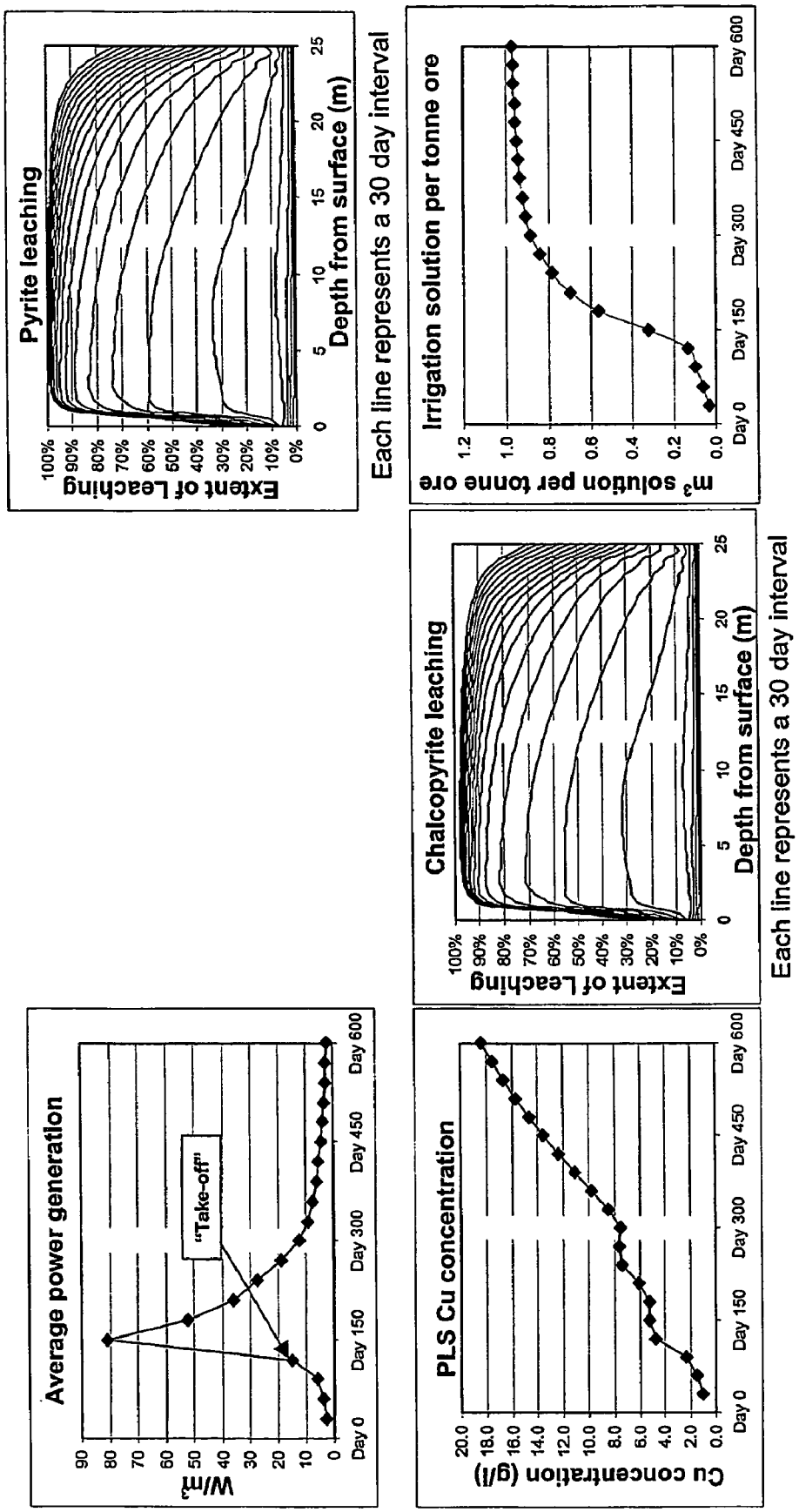
Figure 27 – Power, PLS copper, mineral leaching and irrigation application per tonne of ore for Example 2

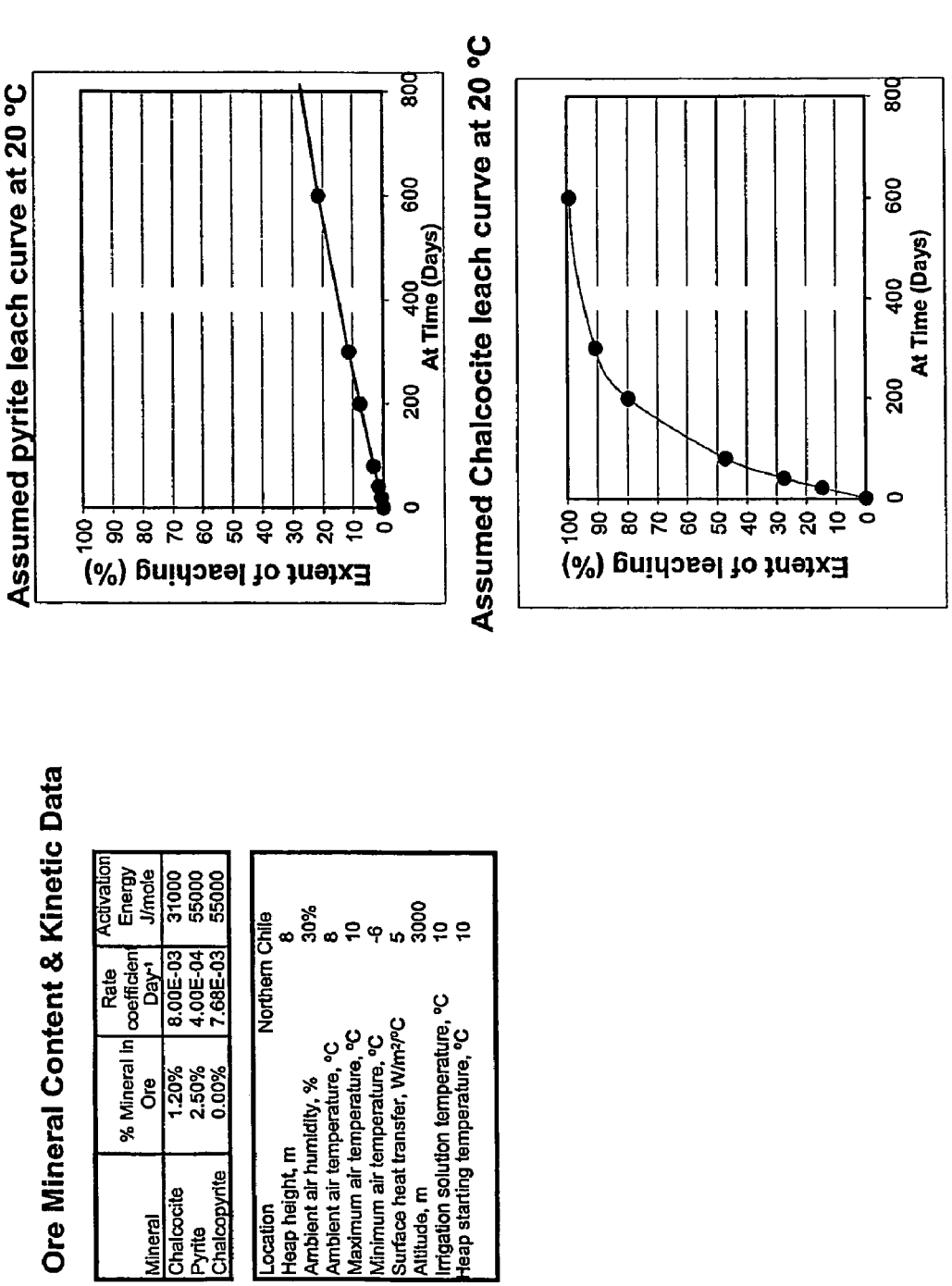
Figure 28 – Mineral leaching kinetics and other data for Example 3

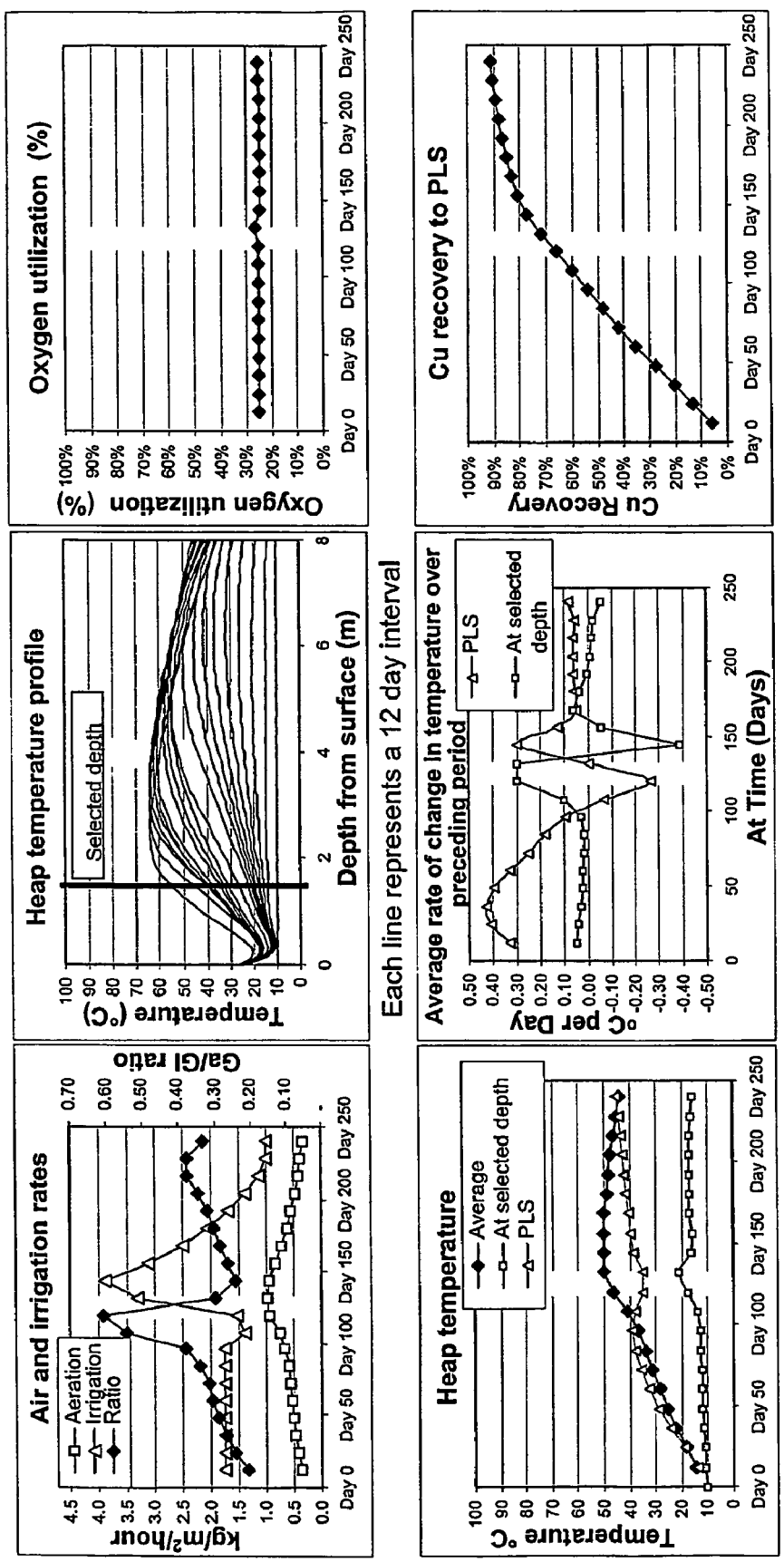
Figure 29 – Irrigation, aeration, temperature, oxygen utilization, copper recovery for Example 3

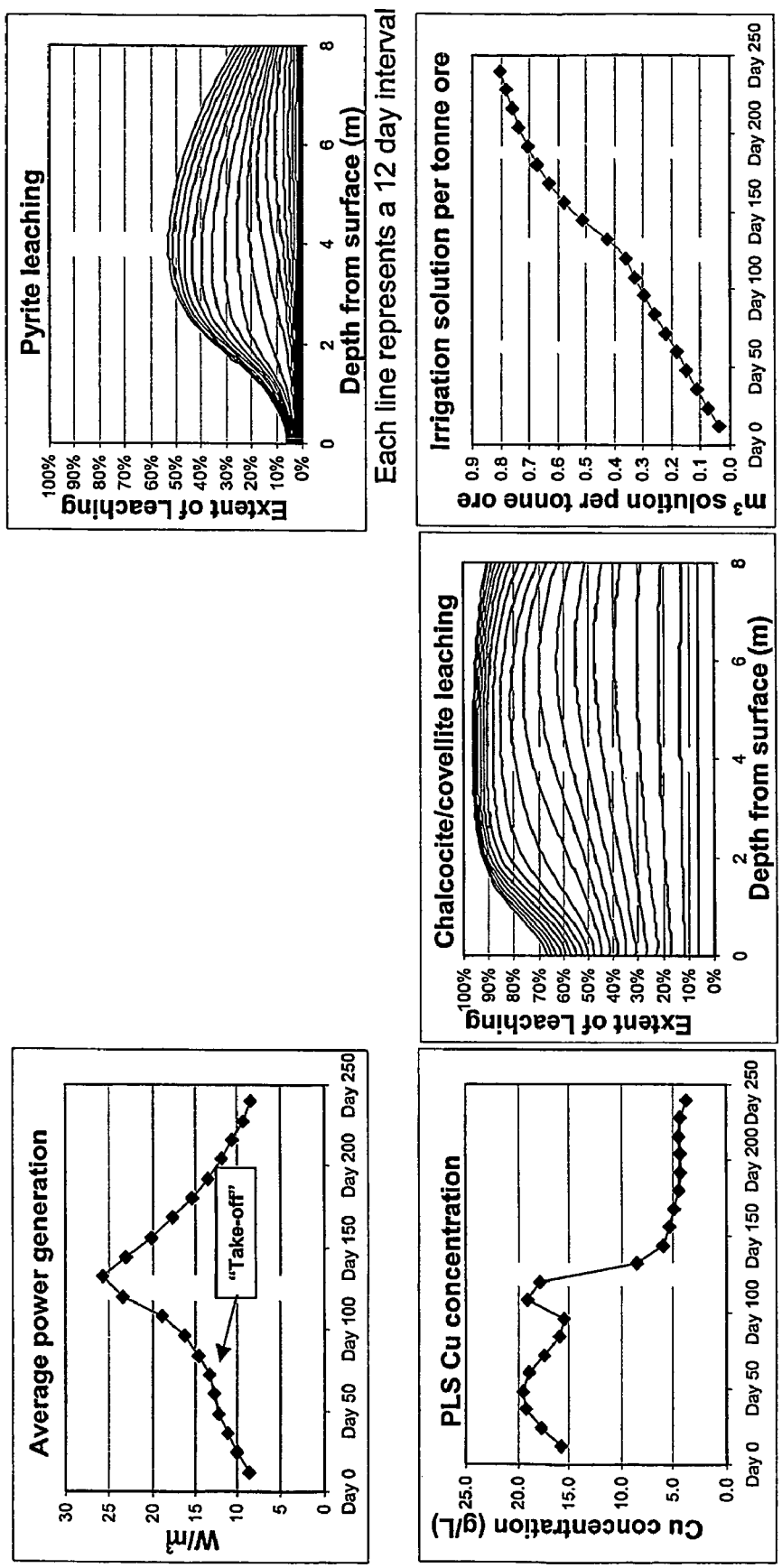
Figure 30 – Power, PLS copper, mineral leaching and irrigation application per tonne of ore for Example 3

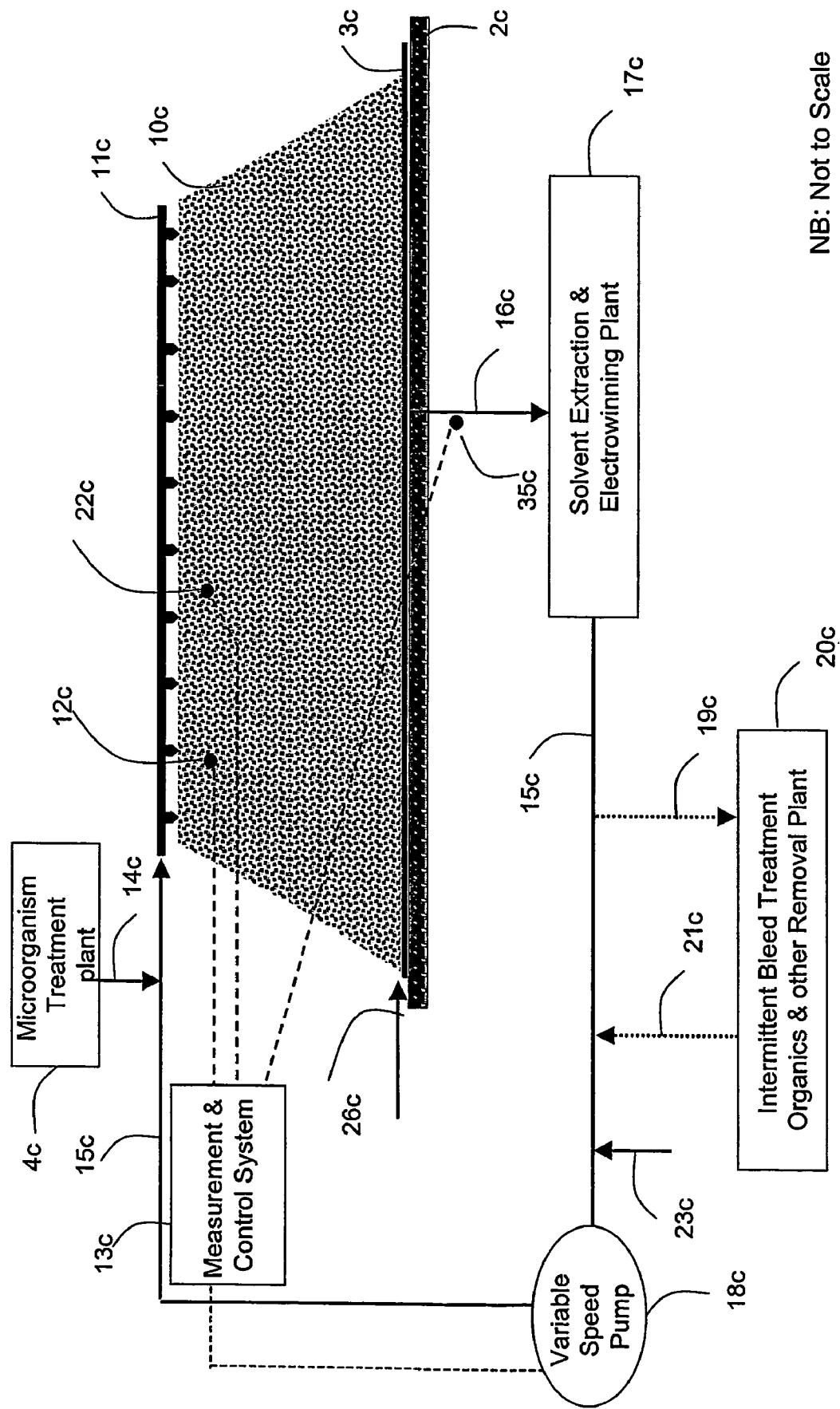
Figure 31 - Illustration of operation in Example 4

HEAP LEACH PROCESS

FIELD OF THE INVENTION

This invention relates to heap oxidation and leaching for the recovery of metals from ore, including but not limited to bio-assisted heap oxidation.

BACKGROUND TO THE INVENTION

Bio-assisted heap leaching for recovery of base metals is only carried out commercially on secondary copper sulphide ores. Recent work in Australia has seen the introduction of heap leaching for recovery of nickel from nickel sulphide ores on a semi-commercial test basis[1]. Bio-assisted heap oxidation of refractory gold ores is also used as a pre-treatment process for recovery of gold from such ores.

Typically the secondary copper sulphide heaps operate at temperatures in the range of 10° C. to 25° C. and rely on the exothermic oxidation of secondary copper sulphide minerals to keep the temperature of the heap above ambient conditions. The relatively low temperature limits the rate of sulphide mineral oxidation that can be achieved. Additionally, chalcopyrite ores cannot be leached at these low temperatures because chalcopyrite is generally considered to be refractory to leaching at such temperatures.

An increase in the operating temperature of existing and new sulphide heap leach operations would significantly reduce leach times; ore and metal inventory, ultimate metal extraction and enable the leaching of copper from chalcopyrite ores.

It is well known that the mineral chalcopyrite can be leached satisfactorily at higher temperatures (between approximately 60° C. and 90° C.) using thermophilic microorganisms. Chalcopyrite bearing flotation concentrates (treated in stirred tank bioleach reactors) and chalcopyrite-bearing ores (treated in heap leach test columns) have both been successfully processed in the laboratory. Mintek claim a process whereby chalcopyrite concentrates can be bioleached using moderate themnophiles at around 45° C. by a combination of ultra fine milling and redox control of the slurry as indicated in WO 01/31072 A1. The metal extraction from chalcopyrite ores achieved in simulated heap leaching, using laboratory columns, is dependent on the particle size of the ore, finer sizes generally increasing the amount of mineral that is accessible to the lixiviant. Commercial attempts to use bio-assisted heap leaching on chalcopyrite ores have failed (copper recoveries typically much less than 50% in long time periods ~1-10 years) primarily because of being unable to maintain the ore temperature at that required to satisfactorily leach chalcopyrite. Although chalcopyrite ores can be processed technically by crushing, milling, flotation of a concentrate and processing of the concentrate by a hydrometallurgical process or smelting, these steps are all relatively expensive and heap leaching would provide a more cost effective solution. Furthermore, many primary copper ores are too low in grade to be economic using conventional processes, but heap leaching may make them economically viable, thus opening many copper deposits to be treatable.

In addition to being able to treat chalcopyrite ores, higher temperatures in the heap leaching of base metals from sulphide ores would result in significantly higher leaching rates. In turn, leach pad area as well as ore and metal inventory would be greatly reduced giving substantial economic benefit. For example, a mine treating 15 Mtpa ore with a grade of 1% copper and an overall copper recovery of 80% (producing 120 ktpa copper) would typically have an area under leach of at least 1.5 million $m^2$. Halving this area (by reducing the leach cycle by a factor of 2) would save US$10-30 million on pad construction costs, as well as a similar amount via a reduction in working capital. Higher temperatures are also likely to increase the ultimate amount of metal extracted from the ore (compared to operating at a lower temperature) and ultimate metal extraction is perhaps generally one of the most important factors effecting economic performance. In the previous example an extraction increase of just 5% increases the project NPV, at a 10% discount rate, by about US$60 million. Additionally at higher temperatures pyrite will be oxidised and generate sulphuric acid, reducing the amount of fresh sulphuric acid added into the ore. A reduction in acid consumption of 1 kg/t ore, with an acid price of US$50/t in the example would yield savings of US$0.75 million per annum.

Chalcopyrite ores may contain other sulphide minerals in addition to chalcopyrite, for example covellite, chalcocite, bomite, enargite and pyrite. The oxidation of these sulphide minerals is exothermic in nature; on average sulphide minerals have a calorific value of around 25000 kJ/kg of sulphide. The rate of oxidation of these minerals determines how quickly this energy is released. If we consider 1000 $m^3$ of ore with a bulk density of 1.7 $t/m^3$, the ore mass is 1700 t. Consider, as an example, that the ore contains 2% sulphide in the form of sulphide minerals. If the sulphides are fully oxidised over a period of 183 days, then the energy (1700 t×1000 kg×2% sulphide×25000 kJ/kg=850 GJ or 236 MWh) is released over a period of 4368 hours. In this example the power generation represents ~54 $W/m^3$ and can be likened to an electric light bulb, uniformly distributing ~54 W within each cubic meter of the ore heap. Furthermore the energy required to heat the rock (ignoring for the moment any moisture and air within the heap), with a specific heat of ~1000 J/kg/° C. from ambient (say 20° C.) to the operating temperature (say 60° C.) is 1700 t×1000 kg×~1000 J/kg/° C.×(60° C.−20° C.)=68 GJ; this energy is far less than that which is released during the oxidation reaction. Superficially, therefore, the energy released during the oxidation process is more than adequate to heat up the heap. In reality of course the moisture within the heap, as well as any air, has also to be heated, but this requirement is quite small compared to the requirement for the ore.

However there are several problems with this simplistic approach. There are various heat losses to take into account. In the case of base metals, for example copper, bio-assisted heap leaching requires the removal of dissolved copper and the ore heap is typically irrigated with an acidic lixiviant (usually solvent extraction raffinate) containing at least some iron in solution. The incoming irrigation solution will always be cooler than a satisfactorily operating heap and absorb energy (released in the exothermic oxidation process) as it passes down the heap, increasing in temperature as it does so. Bio-assisted heap leaching also requires air to be blown through the heap to provide oxygen for the oxidation reactions. In typical Chilean conditions, for example, the ambient air will be cold and contain a small amount of moisture. As the air enters the heap it meets the hot solution and cools the solution down transferring energy to the gas phase, which becomes warmer and more humid as it continues to rise, passing counter-current to the solution, until it meets the cooler regions at the top of the heap, where it cools down and water is condensed from the air. Additionally there will be some heating (during daylight) and cooling (during the night) of the heap surface, as well as cooling due to surface evaporation and radiative emission. At the same time the sulphides in the rock are generating heat of reaction; a complex system that will nevertheless reach a dynamic operating temperature profile throughout the depth of the heap. There will be very minor losses from the sides and bottom of the heap as well. Surface heat losses (as well as water to evaporation) can be reduced by partially covering the heap with an insulating layer. Plastic sheeting has been used recently in industrial operations.

The air is provided on commercial operations by blowing air through a network of perforated pipes beneath the heap. However the air has another important role, over and above the provision of oxygen for the oxidation reactions, which is the movement of heat up or down within the heap.

Dixon gives a good account of the overall energy balance of the heap system[2]. Of particular note in Dixon's findings was the importance of the aeration mass flow Ga, relative to the solution irrigation mass flow Gl, both expressed in kg per $m^2$ per hour. In the system considered by Dixon, there was a ratio of the aeration rate to the irrigation rate, that is to say Ga/Gl, which produced the highest heap average temperature, which Dixon found to be ~38° C. at a Ga/Gl ratio of 0.5. Below this ratio, the average heap temperature fell off. Dixon indicated there was a critical blowing rate, corresponding to Ga/Gl ratio of 0.35, for heat to be begin moving towards the top of the heap.

Dixon explained the net heat movement effect by the "combined advection coefficient". The net or combined advection coefficient is a measure of the transfer of energy up or down the heap as a result of the transport of solution and gas phases up or down the heap. The solution moves heat downwards and moist warm air moves it upwards.

Dixon does not recommend a method of controlling the heap. However, he concluded that increasing the temperature within a heap could be achieved by:

Choosing a lower value for the solution irrigation rate than the current practice Higher rates of irrigation result in washing of heat out to the PLS, to the detriment of heap temperature.

Choosing a higher value for the aeration rate than the current practice

The aeration rates in typical industrial operations are insufficient to move heat upwards; consequently heat is lost to the irrigation solution as it exits the heap. Increasing the aeration rate can push heat upwards into the heap, significantly increasing average heap temperature. Increasing aeration rates was one of Dixon's major recommendations.

Applying an evaporation shield to the heap surface

An evaporation shield will reduce the effective surface heat transfer coefficient and resulting heat losses, increasing the average heap temperature. Recent industrial practice has seen heaps being covered with plastic sheeting.

Heating the irrigation solution

Due to the day/night cycle and evaporative cooling at the top of the heap, Dixon found that heating the irrigation solution from 10 to 30° C. only increased the average heap temperature by about 3° C., in the best case (which was co-incident with operating the heap sub-optimally) and barely had any effect at all when operating the heap at a more favourable Ga/Gl ratio. Covering the heap with plastic sheeting only mitigates this effect to a small extent.

Heating the air with and without humidification.

Heating air without humidifying it has little effect because of the low heat capacity of dry air. Humidifying and heating the air significantly increases heap temperature, but at the cost of applying external energy.

Further results were presented by Dixon[3] for the application of his recommendations to the operation of a Geobiotics heap, in which sulphide concentrates, coated onto a support rock, are leached on a heap. From this work he concluded that the irrigation rate required was between 5 and 10 kg/$m^2$/hr and that the aeration rates were between 25 and 40% of the irrigation rate.

AU-A-60837/90 ("Oxidation of Mineral Heaps") claims a method for controlling the rate of oxidation in the heap based on the use of the mathematical model to predict the effect of the changes in the operating variables. These control variables are heat and water. AU-A-60837/90 describes the control of the heap as a process of the determination of the oxidation rate and the mathematical prediction of the effect of a variety of control variables will have on the global and intrinsic oxidation rates at some point in the future. The results of the mathematical prediction are used to choose the values of the control variables in order to control the operation of the heap.

Ritchie[4] summarises the work performed by himself, Pantelis and Davis. This work elaborates on the control philosophy suggested in AU-A-60837/90, that is, to control the temperature in the heap through a measure of the oxidation rate, and choose the values of the control variables based on the predictions of a mathematical model. The oxidation rate can be determined by a number of methods, including the determination of the oxygen in the effluent gas.

In this specification:

The term "take-off" means a point at which the power generated in the heap rises from a fairly low rate to a higher rate in a relatively short time period; it is the system bifurcation point.

The phrase "average irrigation rate" means the total irrigation amount applied to the heap over the total duration of the leach cycle expressed as a average hourly irrigation rate per unit area; and the phrase "average aeration rate" means the total gas amount passing through the heap over the total duration of the leach cycle expressed as a average hourly aeration rate.

The phrase "instantaneous irrigation rate" means the instantaneous irrigation rate applied to the heap over any time period shorter than the total duration of the leach cycle expressed as instantaneous hourly irrigation rate per unit area; and the phrase "instantaneous aeration rate" means the instantaneous gas flow rate applied over any time period shorter than the total duration of the leach cycle expressed as instantaneous hourly aeration rate per unit area.

The terms irrigation rate and aeration rate refer to the instantaneous irrigation rate and the instantaneous aeration rate respectively, unless otherwise stated.

The term "heap leaching" means leaching of ore in heaps or dumps.

The term "oxygen utilization of the heap" means the total oxygen consumed within the heap expressed as a percentage of the total oxygen passed through the heap.

The term advection means the net transfer of energy up or down the heap.

OBJECT OF THE INVENTION

It is an object of this invention to provide a heap leaching process that at least partly alleviates some of the abovementioned problems.

SUMMARY OF THE INVENTION

In accordance with this invention there is provided a method of controlling a heap leach process through controlling an irrigation rate of a heap as a function of at least one of an aeration rate of the heap, a determination of advection at least at one predetermined point in the heap, and a determination of temperature at least at one predetermined point in the heap.

There is further provided for the heap to be aerated by means of natural convection, and for the natural convection to be at least partly induced.

A further feature of the invention provides for the aeration to be forced and for the method to include the step of controlling the aeration rate as a function of a determination of the oxidation rate of material within the heap.

There is further provided for the method to include the step of determining the advection at or below the heap surface, preferably at a point from 0% to 95% of the heap height below the heap surface, further preferably at a point from 1% to 40% of the heap height below the heap surface, and still further preferably at a point from 2% to 30% of the heap height below the heap surface.

There is also provided for the method to include the step of controlling the aeration rate to maintain a predetermined oxygen utilization of the heap, preferably in the range of 1% to 99%, further preferably in the range of 15% to 90%, and still further preferably in the range of 20% to 85%.

There is still further provided for the method to include the step of maintaining the average aeration rate and average irrigation rate at a ratio in the range of 0.125:1 to 5:1, preferably in the range of 0.15:1 to 2:1, further preferably in the range of 0.175:1 and 1.5:1, and still further preferably at a ratio of about 0.2:1.

There is further provided for the method to include the step of maintaining the instantaneous aeration rate and instantaneous irrigation rate at a ratio in the range of 0:1 to 5:1, preferably in the range of 0:1 to 2:1, further preferably in the range of 0:1 and 1.5:1, and still further preferably at a ratio of about 0.2:1.

There is also provided for the method to include the step of determining the temperature below the heap surface, preferably at a point from 1% to 95% of the heap height below the heap surface, further preferably at a point from 5% to 50% of the heap height below the heap surface, and still further preferably at a point from 10% to 30% of the heap height below the heap surface.

There is further provided for the temperature determination to include a determination of the pregnant leach stream temperature.

The invention also provides for the oxidation rate of sulphide material to be determined as a function of any one or more of determinations of the oxygen content of the heap gas, the pregnant leach stream temperature, the heap temperature, the pregnant leach stream metal content, the pregnant leach stream redox value, the pregnant leach stream oxygen concentration, the heap oxygen uptake rate, the heap carbon dioxide uptake rate, simulation based on at least feed composition, sulphide mineral leaching rates, heap geometry, climatic conditions external to the heap, and historical values of previously leached heaps.

There is further provided for the pregnant leach stream metal content to include recovered metal content.

A further feature of the invention provides for the irrigation to be applied intermittently to the heap, and for the aeration to be intermittently forced through the heap.

A further feature of the invention provides for the heap to be divided into at least two zones and for the process to be at least partly independently controlled in each zone.

The invention also provides for a method of increasing the temperature of heap of material for heap leaching by:

a) equipping a support surface for the heap with aeration and drainage equipment;

b) forming a layer of granular material on the support surface, c) installing an irrigation system proximate the operatively upper surface of the layer of granular material, d) forming a layer of ore, preferably inoculated with suitable microorganisms and at least some acid, on the granular material layer;

e) passing a hot solution through the granular layer by means of the irrigation system to heat the granular layer, f) blowing ambient air through the aeration equipment of the support surface to react with the layer of ore until the temperature of the ore heap reaches a predetermined take-off point, g) at least reducing the hot solution irrigation flow of step e) through the granular layer, h) introducing irrigation of the ore layer and adjusting the aeration through the aeration equipment until a predeterminable normal optimum heap temperature is reached, and i) controlling the heap leaching process as defined above.

There is further provided for the granular layer to be formed from crushed rock.

There is also provided for the hot solution to include at least one of hot pregnant leach solution, hot solvent extraction raffinate, water, or other fluid.

The invention further provides for a method of determining an optimum heap configuration for a bio-assisted heap leach process of an ore heap; by measuring the leaching rate, the heat of reaction, and the sulphide content of the ore; and determining maximum aeration and irrigation rates and an optimum heap height.

According to a further feature of the invention there is provided a method of controlling a heap leach which includes the introduction of microorganisms into the heap of material comprising:

a) preparing microorganisms without exopolymers on their external cell walls;

b) adding microorganisms prepared according to step a) to the heap;

c) un-assisted or assisted re-activation of the microorganisms in the heap to produce exopolymers on their external cell walls.

There is also provided for step a) to include exposing the microorganisms to a low nutrient environment or starving the microorganisms; and for the microorganisms to be starved by limiting the amount of carbon available to the microorganisms.

There is further provided for step b) to include one or more of adding microorganisms to the heap during formation thereof, drip irrigation of the heap, sprinkling of the heap, and pressurized irrigation of the heap.

There is also provided for the assisted re-activation to comprise exposing the microorganisms to a nutrient rich environment; and for the microorganisms' environment to be enriched with nutrients by means of:

a) embedding solid nutrients in the heap;
b) irrigating the heap with a nutrient rich solution; and
c) aerating the heap with a nutrient rich gas, specifically with one or more of a nutrient aerosol or ammonia.
d) aerating the heap with a gas enriched in carbon dioxide.

There is further provided for the solid nutrients of step a) to comprise slow release nutrients.

There is further provided for the method to include the step of embedding a carbon source in the heap, specifically carbonate There is further provided for the un-assisted reactivation to include re-activation due to one or more of prevalent conditions in the heap and natural gas flow through the heap, and for the natural gas to include carbon dioxide.

According to a further feature of the invention there is provided a method of enriching the environment of microorganisms embedded in a heap of material for bio-assisted heap leaching by means of:
a) embedding solid nutrients, specifically a carbon source and more specifically carbonate, in the heap;
b) irrigating the heap with a nutrient rich solution; and
c) aerating the heap with a nutrient rich gas, specifically with one or more of carbon dioxide or ammonia.

There is further provided for the solid nutrients of step a) to comprise slow release nutrients.

There is also provided for a sulphide fuel material to be added to the heap during stacking thereof, for the sulphide fuel to include pyrite or other suitable sulphide concentrate.

BRIEF DESCRIPTION OF THE DRAWINGS

Embodiments of the invention will be described below by way of example only and with reference to the accompanying drawings in which:

FIG. 1 shows the effect of varying the aeration to irrigation ratio (Ga/Gl), with two different methodologies;

FIG. 2 presents a family of curves of average heap temperatures versus Ga/Gl ratio at different power generation rates, and hence different oxidation rates;

FIG. 3 illustrates heat being washed out of a hot heap over time by over irrigation;

FIG. 4 demonstrates the effect of moving out of the optimum Ga/Gl range, as would occur under an upset condition for a particular setup;

FIG. 5 shows the point at which the rate of change of temperature is highest in the example of FIG. 4;

FIG. 6 demonstrates the effect of moving out of the optimum Ga/Gl range, as would occur under an upset condition for a different setup to that of FIG. 4;

FIG. 7 shows the point at which the rate of change of temperature is highest in the example of FIG. 6;

FIG. 8 shows the point at which the rate of change of temperature is highest in the example of FIG. 3;

FIG. 9 shows the effect of oxygen utilization on average heap temperature at various Ga/Gl ratios;

FIG. 10 shows the effect of a decrease in the oxidation rate (and power generation in $W/m^3$) over the leach cycle; which requires a new optimum Ga/Gl ratio along with an optimum absolute aeration rate, requiring a change in the irrigation rate for that particular system over the leach cycle;

FIG. 11 shows that the optimum Ga/Gl ratio and average heap temperature is different for different heap heights;

FIG. 12 shows an example of a 12 meter heap operated at over three phases of oxidation rates corresponding to a power generation of 80, 40 and 10 $W/m^3$;

FIG. 13 shows an example of an 18 meter heap operated over three phases of oxidation rates corresponding to a power generation of 10, 5 and 2 $W/m^3$;

FIG. 14 shows the sensitivity of average heap temperature to the Ga/Gl ratio for higher oxidation and therefore power generation rates at 25% oxygen utilization;

FIG. 15 shows the sensitivity of average heap temperature to the Ga/Gl ratio for a power generation rate of 140 $W/^3$ at 75% oxygen utilization;

FIG. 16 shows the temperature take-off effect in bio-assisted heap leaching;

FIGS. 17 and 18 show the sensitivity of heap take-off to the Ga/Gl ratio;

FIG. 19 shows the effect of oxygen utilization on metal recovery, average heap temperature and irrigation solution per tonne of ore;

FIG. 20 shows an example in which water, at a temperature of 40° C. is passed through a granular layer at a rate of 2.5 $kg/m^2/hour$ and air blown at rate of 0.72 $kg/m^2/hour$;

FIG. 21 illustrates an example of a fixed pad leaching system, which has been equipped with a drainage system as well as an aeration system;

FIGS. 22-24 show the mineral leaching kinetics and other data; as well as the simulation output of the control system for the ore leached in Example 1;

FIGS. 25-27 show the mineral leaching kinetics and other data; as well as the simulation output of the control system for the ore leached in Example 2.

FIGS. 28-30 show the mineral leaching kinetics and other data; as well as the simulation output of the control system for the ore leached in Example 3.

FIG. 31 illustrates an example of a fixed pad leaching system, which has been equipped with a drainage system as well as an aeration system;

DETAILED DESCRIPTION OF THE INVENTION

Dixon's approach to operating the heap at high temperature will not work in practice[2,3]. The solution, in a typical heap leach operated at present, is the fluid in which the metal dissolves and is subsequently recovered by solvent extraction; it is also the medium to add acid during the leach cycle and the main reaction medium. The air, as Dixon[2,3] correctly indicates, has an important effect on temperature. However the main and overwhelmingly important function of the air is the supply of oxygen for the oxidation reactions. The inventors have determined that the air supplied to the heap must at least satisfy the stoichiometric requirements for the oxidation reactions, a factor that Dixon did not consider in his publications[2,3]. So far as the inventors are aware, oxygen utilization in heaps has not been actively studied, but in mesophile tank bioleaching systems, 38-44% is considered best practice, as indicated in WO 00118269A1. For the purposes of illustration in the first instance an oxygen utilization of 25% was assumed, to derive a minimum airflow to satisfy a specific and fixed oxidation requirement for a particular heap height. Although air does push heat up into the heap, it also has a cooling effect at the bottom of the heap.

The heap described earlier, 6 meter in height, at a fixed oxidation rate giving a power generation of 20 $W/m^3$, only requires about 0.15 $kg/m^2/hour$ of air to satisfy the stoichiometric requirements, which were assumed to be 2.0 kg oxygen per kg of sulphide, given 100% oxygen utilization. However, given 25% utilization the air requirement amounts to 0.59 $kg/m^2/hour$. The latter therefore represents the airflow giving the minimum cooling effect at the bottom of the heap, given the maximum oxygen utilization assumed. In contrast Dixon's aeration rates[2] were in the range of 0.83 kg/m²/hour to 7.5 kg/m²/hour (140% to 1270% of the requirement of 0.59 kg/m²/hour at an oxygen utilization of 25%) with the best result achieved at an aeration rate of 2.5 kg/m²/hour, over 400% of the requirement of 0.59 kg/m²/hour at an oxygen utilization of 25%. Such high aeration rates results in severe cooling at the base of the heap. In most operations, the solutions exiting the heap are recycled to the top of the heap via the intermediate PLS pond. The cold solutions produced by Dixon's methodology would lead to a rapid cooling of the heap, which is a major flaw in his recommendations[2]. The effect of the inventors approach is to increase the average heap temperature of about 38° C. found by Dixon[2] at a power density of 20W/m³, to about 52° C., which is significant since this is approaching the minimum temperature at which chalcopyrite would be expected to fully leach; in both cases applying the identical model of the energy balance to Dixon[2]. The data is presented for comparison in FIG. 1.

The major shortcoming of Dixon's model of the energy balance is that sulphide oxidation rates are assumed uniform throughout the heap, irrespective of temperature[2,3]. In fact the oxidation rate will be a strong function of temperature. Since the temperature profile within the heap is quite variable, then the oxidation rates will also be variable. In effect the heat generation in the cooler parts of the heap (i.e. at the top and bottom) will be lower, further reducing the temperature in these areas. Thus the temperature estimates given in Dixon's work[2,3], are likely to be too high at the top and bottom of the heap (biasing the average heap temperature too high). The inventors have improved on the method of Dixon by varying the rate of reaction according to temperature, using the Arrhenius equation, assuming an activation energy of 20500 J/mol. The methodology used in determining the data presented FIG. 2 (described hereinafter) was per Dixon's computational methodology, excepting that the reaction rate was varied according to the Arrhenius equation. Required aeration rates, in this example and those following it, were calculated using a stated and assumed oxygen utilization, a fixed power generation per cubic meter, a reaction heat of 25000 kJ/kg sulphide, an oxygen requirement of 2.0 kg/kg sulphide; all to suit the heap height used. All the other assumptions were per Dixon, excepting surface heat transfer coefficient, which was taken at 5 W/m²/° C. (Dixon's 20 W/m²/° C. is too high in the inventors experience). A family of curves, representing different power generation rates (and hence oxidation rates) is presented in FIG. 2; the air requirements at 25% oxygen utilization are also shown on the curves. It can be seen that at higher oxidation rates (corresponding to 80, 40 and 20 W/m³) the Ga/Gl peak is quite pronounced, with the average temperature dropping off severely once the Ga/Gl ratio falls even slightly below optimum. The drop off is less severe at 10 W/m³, but again average heap temperature reduces. At a low oxidation rate (corresponding to 5 W/m³) the average heap temperature drops even further; also there is no clear maximum Ga/Gl ratio. In solving these equations it is apparent that at below the critical Ga/Gl, the system does not quite reach steady state, then moves away from steady state rapidly as the system becomes "negatively autocatalytic". That is to say as the amount of heat generated is reduced below the cold front, the enthalpy in the air moving upwards becomes grossly insufficient, in the face of cooler solution coming down, to prop up the temperature which collapses. An example of this is given in FIG. 3, which shows the effect of increasing irrigation, by 1.45 kg/m²/hour at the same aeration rate; the Ga/Gl ratio being reduced from 0.261 to 0.226.

FIG. 4 demonstrates the effect of moving out of the optimum Ga/Gl range, as would occur under an upset condition. In this example a heap at steady state with a power generation of 20 W/m³ (operating at the optimum Ga/Gl ratio of about 0.35) is given a step change down to 5 W/m³, the irrigation and aeration rates remaining constant. Such a change in power generation could come about, for example, by a reduction in microbial activity due some extraneous factor.

It can be seen from FIG. 4 that the heat is washed out from the heap as time progresses, because the aeration and irrigation rates are both too high. Two things are required to maintain the heap average temperature in this case. Firstly the aeration rate must be reduced to match the requirements of the oxidation reactions (at a given oxygen utilization) and minimize cooling at the base of the heap. Secondly the irrigation rate must be reduced to bring the Ga/Gl ratio back to the new, and in this instance, higher optimum point.

The inventors have also established that the point at which the rate of change of temperature is highest, in this example, is just under one meter below the heap surface, as can be seen from FIG. 5, which shows change in temperature with respect to time at different depths within the heap following the power reduction generation in FIG. 4.

It can be seen from FIG. 5 that after just ten days following the drop in power generation, the temperature just under a meter below surface has dropped by about 11° C. After twenty days the temperature has dropped by about 21° C. The rate of temperature drop at the peak point is about 1° C. per day over the first twenty days. The actual point at which the temperature changes will be different for different systems, but fairly near to surface. For example FIGS. 6 and 7 show a different system, with a 12 meter high heap and an oxygen utilization of 50%. In this example the most sensitive point is about 0.5 meters from surface. The rate of temperature drop at the peak point is about 2.5° C. per day over the first ten days. Under a more severe upset condition (such as the example given previously in FIG. 3) the region below surface where the temperature drops, as shown in FIG. 8, is about 0.3 to 0.5 meters below the heap surface. The rate of change in temperature in the region of the peak point is about 18° C. in the first day, 10° C. in the second day and declining to about 7° C. per day over the next two days.

It was mentioned previously that a lower gas flow would result in less cooling at the bottom of the heap, increasing average heap temperature. If the oxygen utilization is 50% then the required aeration rate is halved over what was previously assumed and the cooling effect is reduced at the base of the heap—increasing the average heap temperature, as seen in FIG. 9. Increasing oxygen utilization to 75% further increases average heap temperature. Also the optimum Ga/Gl ratio is lowered in both the 50% and 75% oxygen utilization cases (in comparison with the 25% case), demonstrating that the optimum Ga/Gl ratio is also function of the absolute aeration rate, for a given system. The inventors have therefore established that oxygen utilization will play a significant role in achieving high heap temperatures, by minimizing the absolute air addition to the heap.

Another of the shortcomings in Dixon's work[2,3] was the assumption that the sulphide oxidation rates are constant throughout the life of the heap and that the sulphide minerals all oxidize at the same rate. In reality the oxidation rates are likely to be higher at the beginning (assuming the ore is at an elevated temperature to start with), with readily oxidized mineral phases leaching first and less readily oxidisable mineral phases leaching later on. Thus the oxidation rate will peak early on in the life of the heap and decline thereafter.

As the heap oxidation commences, the oxidation rate will be low; there will be an optimum Ga/Gl ratio and aeration rate during this period. However the heap will take-off (take-off is discussed later) and climb to a relatively high power generation and relatively high rates of irrigation will be required to remove leached metal and to help cool the heap. Aeration rates will have to be similarly high to provide sufficient oxygen for the oxidation reactions, as well as optimally distributing the heat within the heap. There will be an optimum, Ga/Gl ratio and aeration rate for that particular system at that point in the leach cycle. As the life of the heap progresses, fewer readily oxidisable sulphides will be available and the oxidation rate (and power generation in $W/m^3$) will decline. With such a decline the optimum Ga/Gl ratio will change, along with absolute aeration rate, requiring a change in the irrigation rate. Towards the end of the heap leach cycle, the readily oxidisable sulphides remaining will be lower still and so will be the oxidation rate (and power generation in $W/m^3$). Once again there will be a new optimum, Ga/Gl ratio along with an optimum absolute aeration rate, requiring a change in the irrigation rate for that particular system. FIG. 10 illustrates this concept schematically.

Additionally it is apparent to the inventors that heat losses via the heap surface or PLS are a strong function of surface area, thus given an irrigation and aeration in a certain climate and at a given $W/m^3$, increasing the heap height will increase the energy released, whilst maintaining the same heat losses or gains; overall a higher average heap temperature should result. However in these circumstances oxygen demand will also have increased, requiring, at the same oxygen utilization, an increase in aeration proportional to the heap height increase; such an increase in aeration will give additional cooling at the base of the heap. However heap height will nevertheless be a useful variable in the design of a particular system, as illustrated in FIG. 11, and forms another aspect of the invention. It can be seen from FIG. 11 that the optimum Ga/Gl ratio is different for different heap heights. Additionally, in this example, it can be seen that there is a slight reduction in average heap temperature in going from a heap height of 12 to 18 meters. Likewise, the short heap height (4 meter) is also a poor performer, the average heap temperature being about 13° C. lower than the 6 meter high heap.

In hilly or mountainous terrain, relatively flat surfaces are often unavailable, or can only be prepared at significant cost. In such cases ore may be stacked in valleys or other areas where the height of ore will be dictated by geography. In such instances different irrigation and aeration rates can be applied in different zones, corresponding to different heap heights, over the duration of the leach cycle, which is another aspect of the invention.

It will be appreciated by those skilled in the art that the heterogeneous nature of the ore in heaps will require a plurality of measurements of both temperature and oxygen content at least in two dimensions and more likely three dimensions. Such heterogeneity may dictate the need for additional flexibility in changing both aeration and irrigation rates over relatively small zones of the heap surface.

Additionally, operating at a Ga/Gl ratio slightly higher than the theoretical optimum will be a more robust operating strategy in some instances; indeed operating at a fixed Ga/Gl ratio well above the theoretical optimum will be very robust, but may result in inadequate irrigation. Sufficient irrigation, to lower the metal content in solution (particularly copper and iron) to levels suitable for the microorganisms and to simplify solution chemistry, is an important factor in a real operating system.

By way of a very simple example FIG. 12 shows a 12 meter high heap operated over three phases. The first phase is at an oxidation rate corresponding to 80 $W/m^3$, the second to 40 $W/m^3$ and the third to 10 $W/m^3$. The average heap temperature ranges from 61 to 63° C., which is about the lowest temperature that could be expected to fully leach chalcopyrite.

The invention can also be used on ores with very low sulphide content. An exercise similar to the previous one was determined, but with three phases corresponding to 10, 5 and 2 $W/m^3$, which indicated an average temperature of about 61° C. could be achieved, as shown in FIG. 13. As seen previously, at low oxidation rates the system is a lot less sensitive to the Ga/Gl ratio, but nevertheless the absolute values of both need to be controlled to maximise heap temperature, because high irrigation rates can nevertheless wash heat out from the heap. The energy release in the 10 $W/m^3$ phase corresponds to the total oxidation of about 1.6% sulphide in eight hundred days, reasonably low and a level that many economic ores will contain. The eight hundred days is the time it takes for the heap to get to a steady state (in comparison an 80 $W/m^3$, six meter high heap will achieve a steady state in less than 50 days). However if the heap started off at a higher temperature, for example by applying external energy (as will be described later), then the total cycle time could reduce to two hundred days, in such case the total sulphide oxidised amounts to just less than 0.3%, an unexpected and remarkably low content. It will be noted from FIG. 13 that at very low power generations the point at which temperature will drop in an upset condition will lie about 3 to 4 meters below surface.

The finding that high sulphide contents are not a pre-requisite to achieving high temperatures within heaps is significant, as many have believed that the addition of fuel, in the form of sulphide concentrates to be necessary and this is clearly not the case. Although sulphide concentrates will be readily available to the oxidation process and thus will increase rates of temperature rise, they will not increase ultimate heap temperature that much; rather minimizing aeration, by maximizing oxygen utilization and operating at an optimum Ga/Gl ratio is the key.

However, in the case of ores with a low rate of oxidation and low sulphide content, leading to a commercially unacceptable time period to reach the take-off point, the addition of a sulphide concentrate fuel to the heap would assist in bringing up the heap temperature at a faster rate.

The invention can also be used on highly reactive ores with high sulphide content. If an ore containing a much higher sulphide content of, for example, around 7% is considered, then power generations of 200 $W/m^3$ are quite readily achievable. The sensitivity of average heap temperature to the Ga/Gl ratio is shown for a power generation of 200 $W/m^3$ in FIG. 14, with 80 $W/m^3$ shown for comparison. Because the aeration rate to supply sufficient oxygen at 25% utilization is that much higher at a power generation of 100 $W/m^3$, there is more cooling at the base of the heap, thus average heap temperature is not, in fact, much different from the 80 $W/m^3$ power generation case. Once again though, the system is sensitive to the Ga/Gl ratio and if the power generation drops, then heat can be washed quickly from the heap. The point at which the temperature declines under upset conditions in this case is barely below surface, for example 0.1 meters below surface.

FIG. 15 shows the sensitivity of average heap temperature to the Ga/Gl ratio for a power generation of 140 $W/m^3$ at an oxygen utilization of 75%. A very high average heap temperature, exceeding 80° C. is obtained at a Ga/Gl ratio of 0.15. The power generation rate of 140 $W/M^3$ corresponds approximately to the value used by Dixon in his Geobiotics work[3]. Several of Dixon's gas flow rates require in excess of 100% oxygen utilization and data derived from such points is not meaningful.

In the case of a pretreatment process for refractory gold, the invention could be used for controlling heap temperature at a high, and optimum level, by irrigating with cold water rather than raffinate.

In summary at this point, the inventors have established that the absolute aeration and irrigation rates, as well as the ratio between them, are very important factors in determining the average heap temperature, and that these variables may require significant adjustment for different oxidation rates and heap heights in a given location. Additionally the inventors have established there exists a region in the heap, between near surface and typically up to a meter below the surface, at which temperature changes rapidly (relative to heap leach cycle times) in an upset condition (up to 4 meters below surface at very low oxidation rates). Also the inventors have established that to maximize heap temperature the air addition to the heap must be minimized, by maximizing oxygen utilization. Since reaction rates are invariably not linear, the oxidation rate will decline in some manner with respect to time, and the in situ power generation will drop with time. The only way to maintain the average heap temperature at a high and optimum level is to vary the irrigation, throughout the leaching cycle, in a proportion to the aeration rate such that the Ga/Gl ratio remains above the critical level. Simultaneously, aerating at a rate appropriate to the oxidation requirements minimizes the cooling at the base of the heap. The temperature in the heap, especially at a point up to about a meter or so below surface may be used to verify the appropriateness of the Ga/Gl ratio at that point in the leach cycle. The aeration may be varied to suit oxidative requirements, according to, for example, the oxygen content of the gas phase within or emanating from the heap, to obtain the desired oxygen utilization. In an upset condition, the oxygen level of the gas will change rapidly, within hours, giving an early indication that all is not well in terms of sulphide oxidation. A subsequent temperature drop, about one to ten days later, in a region typically up to about a meter or so below the heap surface, will confirm this.

In conditions where the sulphide oxidation rate changes as a result of the oxidation rate changing (due to reaction kinetics for example), oxygen levels in the gas phase will change and aeration will be adjusted to maintain the same offgas concentration. The irrigation rate must be changed to maintain the same or a new Ga/Gl ratio, which will maintain the optimum heap temperature, over the leach cycle.

The mechanism of temperature collapse in an over-irrigation situation lies in the fact that the liquid phase advection becomes substantially greater than the advection due to the gas phase. Direct determination of the liquid and gas phase advection coefficients, will enable the irrigation to be varied directly to maintain a suitable net advection coefficient at some point in the heap, the aeration being supplied to suit oxidative requirements, for example according to offgas oxygen concentration, at a particular oxygen utilization. However, the best point to determine the advection coefficients will be at the point of maximum sensitivity during upset conditions, which we have seen already lies relatively close to the heap surface under most conditions. Additionally a target of zero, or a slightly positive net advection, is best achieved close to the heap surface, to bring the temperature peak as close as possible to the top of the heap. It is also easier to control at a zero or slightly positive value near the surface than a specific value elsewhere in the heap.

The advection coefficient control method of operation will have the advantage of applying the maximum irrigation for that particular system and will take into account changes in climatic conditions and even rainfall automatically. The disadvantage is that on start up there will be a tendency to reduce irrigation to very low levels until the upward gas heat flow is established. Such a position may be satisfactory in many cases, but in others, especially on chalcocite containing ores where copper is easily leached in the conversion to covellite, high copper tenors may result. In such a case, different net advection setpoints can be used or irrigation may be applied proportionately to aeration according to a pre-determined Ga/Gl ratio and then switched to advection control as the gas advection becomes positive.

One of the major advantages of the invention is that since heap 20 temperature is maximized by providing sufficient aeration, at a suitable oxygen utilization, as well as optimum irrigation, throughout the leach cycle, there is no need to know the individual oxidation rates of the different sulphide mineral species. The invention is therefore one of reactive control rather than predictive modeling; the invention is one of feedback control rather than feed-forward control.

Additionally, it will be appreciated by those skilled in the art, that indirect methods also exist for determining changes in oxidation rate, in addition to oxygen levels in the offgas, for example, a single or multiple determination of one or more of the following could be used instead, wet and dry bulb temperatures of the gas phase, solution redox, solution oxygen, solution metal content (especially recovered metal content), solution temperature (especially exiting the heap), heap temperature (especially changes in temperature), and oxygen and/or carbon dioxide uptake rates within the heap. Additionally, simulation based at least on feed composition, heap geometry, location and climate; historical data from old heaps, a fixed gas flow giving an average oxygen utilization of between 1 and 100% during the leach period, all may be an appropriate basis for controlling aeration. Also, it will be appreciated that whilst control algorithms may be necessary to manipulate the air and irrigation rates in certain circumstances, in other circumstances manual control may suffice.

It will also be appreciated by those skilled in the art, that the direct control of gas and/or liquid advection, or the gas advection and/or liquid advection coefficients, could be used in place of the control of the net advection coefficient.

It will be appreciated by those skilled in the art, that the control philosophy disclosed in AU-A-60837190 is one of predictive control in the heap. Measurements are made, and the values of the control variables are chosen based on the prediction of a mathematical model. AU-A-60837/90 does not prescribe how the control is to be implemented; in other words, AU-A-60837/90 does not disclose how the values of the control variables are linked to the measured variables. However, the independent variable that is to be controlled is clearly stated as the oxidation rate. The efficacy of the control of the heap, as disclosed in AU-A-60837/90, is critically dependent on the reliability of the mathematical model, in describing the behaviour of the heap in response to the changes made to the control variables. The invention disclosed herein is based on a reactive system, in which there is no need for a mathematical model in the control methodology; the measurement and control variables are clearly linked. In addition, the independent variables in the present invention are clearly the aeration and irrigation rates, whereas the independent variable in AU-A-60837/90 is clearly the oxidation rate.

As described in AU-A-60837/90, the control variables are "heat" and water. "Heat", or more scientifically energy, is equated with direct heating, such as electrical heating, or indirect heating, such as the addition of air. However, as Dixon clearly indicates, "heat" and aeration in the context of heap leaching are not equivalent or even proportional to one another. Dixon[2,3] clearly shows that an increase in the aeration rate can, under some circumstances increase the average temperature in the heap and, in other circumstances, decrease the average temperature of the heap. However, an increase in aeration always results in increased cooling at the bottom of the heap (refer FIG. 1, Dixon approach). The increased cooling at the bottom of the heap is significant because solutions are recycled from the bottom of the heap to the top. For this reason, cooling at the bottom of the heap will result in the eventual cooling of the entire heap.

Neither Ritchie[4] nor AU-A-60837/90 discloses the importance of the Ga/Gl ratio in the operation of the leaching process.

Dixon[2,3] does not prescribe a method for the control of the heap during the heap leaching cycle. While AU-A-60837/90 does consider aeration to be important as both an advection phase and a supply of oxygen, Dixon[2,3] does not consider the aeration from the standpoint of the supply of oxygen, indeed some of his aeration rates well in excess[2] of stoichiometric requirement, whilst others are well short[3]. In the latter case for example at a power generation rate of 140 W/m$^3$ the stoichiometric requirement at 100% oxygen utilization is 1 kg/m$^2$/hour. However, several of the points presented in Dixon's data[3] are less than this amount and are not operable in a real system. The data for an operable system at 140 W/m$^3$ and oxygen utilization have already been presented in FIG. 15. In addition, Dixon[2,3] does not consider the change in the rate of oxidation with time, a well-known feature of leaching reactions. His recommendations are applicable to static conditions with a large excess of air compared to stoichiometric requirements in one case[2], and static conditions without regard to oxygen stoichiometry in another[3]; neither of which have any bearing on heap leaching in practice.

Previously it was said that oxidation rates will be highest at the beginning of the cycle and this is true, providing the heap is already at an elevated temperature when the oxidation process starts.

The most difficult aspect of heap leaching of copper ores, particularly those containing chalcopyrite, is being able to start the leaching process at a high oxidation rate. Many sulphide ores may be at a low temperature when they have been mined. Typical Chilean ores, for example, will have been mined at an ambient temperature of around 10° C. At these temperatures, the only sulphide mineral that leaches readily will be chalcocite, the generally more abundant pyrite will only leach to a very limited extent and chalcopyrite hardly at all. Even then, the chalcocite leaches fully, only very slowly in commercial operations, with typical leach cycles well in excess of one year. The only way to speed up the oxidation process is to increase the temperature, but this represents the classic "chicken and egg"—the sulphides won't readily oxidise unless the temperature is increased, but the temperature won't increase until the sulphides begin to oxidise. Clearly, what is required is to "kick-off" the process during start-up, which brings us to another aspect of the invention.

To those skilled in the art, the ability of microbial systems to "take-off" (i.e. to become autothermal) is well known in tank bioleaching systems, where at some point after starting the bioleach reactors, external heat no longer need be applied and the system becomes autothermal. Soon thereafter the bioleach tanks require cooling. The inventors are aware that the same effect has been observed in sulphide heap leaching, although generally under uncontrolled conditions. What is required to achieve the high temperatures, especially to leach chalcopyrite, reduce leach cycle periods, and to increase ultimate metal extraction, is to consistently increase the heap temperature to a point where the system takes-off. The concept of take-off is illustrated schematically in FIG. 16. The take-off temperature point will be different for different systems, as well as taking a different time period in different systems. For example, where a heap contains readily oxidisable sulphide species (for example pyrrhotite) the heap may well take-off quite quickly in, for example, a few weeks; indeed cooling, rather than take-off, may be the greatest issue in managing the overall leach cycle. The examples shown in FIGS. 1, 2, 9, 11, 14 and 15 all assume various fixed power generations (varied with temperature according to the Arrhenius equation, excepting FIG. 1) with no sulphide mineral depletion. The examples in FIGS. 12 and 13 use three power generation rates during a leaching cycle, attempting to simulate the depletion of sulphide fuel over time. In practice however it is likely there will be multiple sulphide species, with different leaching rates and activation energies, all depleting non-linearly with time as the leach cycle progresses. In order to simulate this position the Dixon model (with variation in reaction rates with temperature according to the Arrhenius equation) was adjusted to cater for three separate sulphide species, with known or assumed leaching curves at a known temperature and taking into account depletion of these sulphide species during the leaching cycle. Oxygen depletion is taken into account as air passes through the heap. Aeration is supplied to maintain an oxygen utilization setpoint (or range of setpoints).

Using the model on a mixed sulphide ore with composition and leaching kinetics, and general conditions as indicated in FIG. 22 (described hereinafter), a series of runs were conducted to determine the sensitivity of the system, in terms of take-off, to the Ga/Gl ratio. The aeration was supplied to give an oxygen utilization of 40% via determination of the oxygen content of the heap offgas. Irrigation was applied according the required Ga/Gl ratio i.e. irrigation was applied by dividing the aeration rate by the Ga/Gl ratio. The results are illustrated in FIGS. 17 and 18. It is apparent from these figures that, for this system, Ga/Gl ratios of between 0.075 and 0.100, give no real take-off; a slight improvement occurs at a Ga/Gl ratio of 0.125. A Ga/Gl ratio of at least 0.15 is required for any real take-off, with a Ga/Gl ratio of 0.3 giving the best result. Typical industrial operations essentially operate at fixed aeration rates and irrigation rates at a Gal/Gl ratio of 0.02 to 0.10 and such operations will never take-off in these circumstances. Additionally since the air is fixed, as opposed to being varied according to oxidative requirements, an additional problem will be cooling of the base during the start-up phase as the air will be well in excess of stoichiometric requirements, further reducing the likelihood of a take-off.

It should be noted that these Ga/Gl ratios are applicable to the take-off of the heap, and not the peak operating point, where the critical Ga/Gl ratio is much lower, as low as 0.125 (as illustrated in FIG. 9 earlier). Lower Ga/Gl ratios are conceivable with the higher oxidation rates associated with more reactive heaps, especially in tall heaps.

Using the model on a hypogene copper sulphide ore with composition and leaching kinetics and general conditions as indicated in FIG. 25 (described hereinafter) a series of runs were conducted using various oxygen utilizations. Maximum irrigation was restricted to 40 kg/m$^2$/hour and minimum irrigation restricted to 0.5 kg/m$^2$/hour. The results are presented in FIG. 19 and indicate metal extraction, maximum heap temperature and average heap temperature all increase as the oxygen utilization setpoint is increased. The Ga/Gl ratio was reduced from an average value of 0.90 at the lowest oxygen utilisation to an average value of 0.19 at the highest oxygen utilization. Copper solution tenors were acceptable, averaging less than 10 gl in all cases. Irrigation solution applied per tonne of ore also reduces as the oxygen utilization setpoint is increased. In practice oxygen utilizations can be varied, consistent with adequate solution volumes per tonne of ore, throughout the leach cycle.

Bringing the heap to the take-off temperature can be achieved by one of three methods in the invention.

Firstly, the heap may be brought to the take-off temperature or at least higher than ambient conditions, completely autogenously, via oxidation of the sulphides in the heap.

Secondly, in a fixed pad, open-lift system, warm moist air from spent heaps can be blown into new ore that has been placed on top of the leached ore. Alternatively warm moist air can be sucked from the spent heaps by reversing the blower fans and then fed into the aeration system of a new heap. The latter method also works with the on-off pad method.

Lastly, an additional method of bringing the heap up to the take-off temperature, which is another aspect of the invention, is to form a layer of granular material of a pre-determined thickness, on a pad, the pad which has been equipped with a suitable aeration and drainage system. Near the top of the granular material layer a permanent and robust buried irrigation system is installed. Fresh ore is then stacked on the layer of granular material, suitably inoculated and acid stabilised. Hot solution (including hot PLS or heated solvent extraction raffinate or water) is passed through the layer of granular material using the buried irrigation system installed at the top of the layer of granular material. If hot PLS, is used it has the advantage of being able to be continuously added, without concerns regarding dilution of the solution inventory. At the same time ambient air is blown into the base of the layer of granular material within the heap. The layer of granular material forms a surface, on which heat is transferred from the warm solution to the incoming air, which then passes through the ore heap, increasing it's temperature to the take-off point. By way of example, the concept is illustrated in FIG. 20, in which water, at a temperature of 40° C., is passed through the layer of granular material at a rate of 2.5 $kg/m^2/hour$ whilst ambient air is blown into the granular layer at rate of 0.72 $kg/m^2/hour$. The gas exiting the layer of granular material is at about 40° C. and nearly fully saturated and is well suited to heating the ore heap above it. The hot water or solution can be from any source, for example: PLS from elsewhere in the system; solvent extraction raffinate; waste heat from power generation or cooling fluid from bioleaching stirred tank reactors (both directly or indirectly); or other stream above ambient temperature; including fluid warmed using solar heating; or other heat bearing fluid with heat suitably transferred from any source outline previously, via a heat exchanger. Once the take-off temperature has been reached in at least a part of the ore, the hot water or solution addition at the top of the layer of granular material is stopped. Then solution irrigation and aeration can be gradually increased to the operating level in a controlled manner, and the heap brought up to the desired operating temperature. Thereafter the heap is operated according to the methods described previously.

Another advantage of this method is that once the leaching of the ore takes place, the layer of granular material continues heating the rising air and cooling the PLS, thereby reducing heat losses to the PLS and increasing the average heap temperature by at least about 1° C. This is especially useful where oxidation rates are relatively low and the PLS is relatively hot (the low aeration rate giving less cooling at the base). In effect the cold "tail" of the heap is brought outside the ore into the layer of granular material, where temperature is unimportant because there is no leaching. Thus even in favourable circumstances where the heap can be brought up to temperature autogenously, there would be an advantage in using such a layer of granular material at the base of the heap, because it will move the cold "tail" of the heap outside of the ore and increase average heap temperature. The layer of granular material could be crushed rock, sand, gravel, synthetic material or even a heat exchanger external to the heap. The thickness of the layer of granular material is dictated by practicality more than any other criteria, but must have good surface area and remain permeable over the course of time. In the fixed pad system the previously leached ore may act in place of the layer of granular material. Even if the hot solution were added indefinitely for all freshly stacked ore heaps the cost would be modest (assuming purchased energy) at less than USc2/lb copper for a typical copper heap leach. In practice though, the cost would reduce, as the system would not operate continuously on all new heaps.

In the event a higher temperature is required, PLS solution can be bled from the system, heated (for example by using hot water or other solution in a heat exchanger, or by using solar heating) and then recycled back to the layer of granular material. In this way ambient air entering the heap is warmed and humidified throughout the leach cycle, and forms another aspect of the invention. Alternatively the ambient air can be warmed and humidified before entering the heap, for example by steam injection.

Although both the two previous steps require the application of external energy, which will add to cost (unless waste or natural heat is used, for example from stirred bioleach tank vessels, or from solar heating), but such cost may be warranted by additional copper that is recovered and/or a reduced overall leach period. It will be appreciated that in heating and humidifying the air going into the heap will change the optimum Ga/Gl ratio for a given system, since the irrigation solution has to overcome a greater upward heat flux from the warm and humid air. For heap that has a rapidly dropping temperature under an upset condition, the addition of hot humid air would be a useful control tool.

It will be appreciated that in a fixed pad system with open lifts, the ore in the cooler parts of the heap will not leach fully, but will have another opportunity to see hot solutions, and leach further, from later heaps placed on top, which is not the case in the on-off system.

According to another method of the invention, with ores that take a commercially unacceptable period to achieve the take-off temperature (for example eight hundred days) a sulphide concentrate fuel, for example pyrite, may be added to the ore heap whilst it is being stacked. The heap is then brought up to the take-off temperature and then operated by any of the methods previously described.

It will be appreciated that heap temperatures can be improved by other methods. Irrigation solution can be applied intermittently, for example during daylight hours only; as well as to achieve the low rates needed at low oxidation rates, or both. Additionally intermittent irrigation will have the effect of refreshing stagnant areas within the heap.

Aeration can also be applied intermittently, especially at low flow rates, where the air in stagnant areas can be similarly refreshed.

Ambient conditions (wet and dry bulb temperature etc.) can be measured continuously, in order to provide data to the control system.

Notwithstanding the fact that applying hot irrigation solution has a relatively small effect on average temperature, even that small effect would be beneficial. Consequently, design of solution drainage, irrigation and general handling systems should be carried out to minimize heat losses where practical.

Irrigation slightly below the surface will help reduce immediate evaporation losses, and reduce the overall surface heat transfer coefficient.

The use of plastic covering on the heap surface, with integrated solar heating channels to warm either irrigation or other solution or preferably recycled PLS, will assist in maintaining a high temperature within the heap.

It will be appreciated that the invention can be used during the start-up of the heap, with aeration being adjusted to supply the oxidation reaction requirements by, for example, measuring the oxygen content of the gas phase within, or arising from, the surface of the heap. Minimal irrigation will be applied during the early part of the start-up period, to maximise the rate of increase in heap temperature, but irrigation will gradually be applied in the start-up phase according to temperature measurements within the heap and/or the PLS temperature and/or at a suitable ratio to the aeration rate. Alternatively irrigation can be varied independently of the aeration to maintain a pre-determined advection coefficient, at a suitable point beneath the heap surface.

For reactive heaps, high temperatures will appear close to the surface quite quickly, in days or weeks, in less reactive heaps the process will be slower and could be monitored using a plurality of temperature measurements at different depths within the heap, or the temperature of the PLS.

An additional possibility of the advection coefficient control method lies in non-forced aeration dump leach operations that rely on the natural convection of air through the heap for the supply of oxygen. In such cases, irrigation can be manipulated based on a determination of the advection coefficient beneath the surface of the heap, attempting to maintain a suitable value. Alternatively, irrigation can be varied according to the temperature below the surface and/or the gas flow rate. The heterogeneous nature of the airflow may require different irrigation rates at different points on the surface of the dump. The new inoculation method, described hereinafter, will be particularly useful in this case. The new method of preparing microorganisms (described hereinafter) will be especially suitable for such dump leach systems.

The rate of dissolution of sulphide minerals is dependent on the catalytic action of microorganisms in the heap. In both the start-up phase and the operational phase of the heap operation, these microorganisms play a critical role. It will be noted by those skilled in the art that the likely operating temperature of heaps, operated according to the method of invention, will barely fall in the range of operation of extreme thermophiles. Thus a mixture of suitable mesophiles and moderate thermophiles will find more application for most high temperature heap leaching applications; suitable extreme thermophiles only being required in some instances, especially those involving leaching of chalcopyrite. It will be necessary to inoculate the heap with suitable bacteria and/or archaea that catalyse the oxidation of sulphide minerals. The suite of microorganisms used will depend on the ultimate desired heap operating temperature and the temperature ranges the heap passes through as it moves towards its final operating temperature. It is preferable the heap is inoculated, with as concentrated an inoculum as possible, during the stacking process, so that all the microorganisms required will be in situ when oxidation commences, and are then immediately available for ferrous-to-ferric conversion. However, in the case where particle size is large (run-of-mine heap or dump leaching for example), an intimate mix of microorganisms and the ore will be difficult to obtain. Residue from a stirred tank bioleach plant, or plants, would also be suitable as an inoculum.

Where inoculating heaps is carried out simply by irrigating them with a solution enriched with suitable microorganisms, the microorganisms will not penetrate the depth of the heap. Rather, they will stick to the rocks and minerals at the point of irrigation or injection, thus forming a "skin" of microorganisms at the surface of the heap. This is because the external cell walls of the microorganisms are coated with exopolymers that are adhesive. In fact, this property of the adhesive nature of microorganisms is the basis for the effectiveness of sand filters in the purification of water.

Thus it is very difficult to inoculate the entire body of the heap with microorganisms in their normal vegetative state by simply irrigating the heap with inoculum; at finer particle sizes it will become virtually impossible.

However, bacteria and archaea, that have been specially treated to reduce the production of polymeric material on the external surface of their cell walls, will penetrate the heap and will not stick to the mineral and rock surfaces of the heap. Such a preparation of microorganisms will enable the heap to be fully inoculated, and will allow the catalytic effect of the microorganisms to resume leaching, allowing the more optimal operation of the heap.

Bacteria and archaea can either be prepared as spores or ultra micro bacteria (UMB). In this state, the microorganisms do not produce polymers on their external cell walls. The heap can be inoculated with microorganisms in this state, by irrigating the heap with a solution enriched in the spores or ultra micro bacteria, and once the spores or UMB enriched solution has fully penetrated the body of the heap, the spores or UMB can be resuscitated from their vegetative state.

Ultra micro bacteria are produced from certain bacterial strains by successive lowering of the nutrients in the growth medium "Starving" the cells in this way will cause them to cease the production of the exopolymers on the external surface of the cell wall, which will result in their adhesive nature, and, in some cases, cause them to reduce in size. The reduced-size cells are called ultra micro bacteria. The important property of this starvation treatment, for this invention, is not the production of ultra micro bacteria or spores, but that bacteria treated in this way do not stick to porous media, and can easily penetrate and effectively inoculate a heap.

The production of microorganisms with reduced exopolymers is most often achieved by reducing the carbon source in the growth media. In the case of microorganisms suitable for heap leaching, the carbon source is often carbon dioxide dissolved in solution. Preparation of the starved cells is achieved by removing carbon dioxide from the solution or limiting the concentration of dissolved carbon dioxide, such as by removing carbon dioxide from the air source required for the growth of the microorganisms, or by using pure oxygen and nitrogen in the gas supply to the growth culture. The reduction of the exopolymers may also be achieved by limiting a nutrient (other than the source of carbon).

Thus, this part of the invention concerns the method of preparing microorganisms prepared in reactor by a suitable starvation method, injecting them into the heap or dump, and then resuscitating them, either by injecting a nutrient rich solution into the heap or dump, or by allowing the microorganisms to naturally revert back to their vegetative state. Using this aspect of the invention, it will be possible to re-inoculate a heap or dump during it's operating life. For example, a simultaneous failure of air and irrigation supply to an active heap will lead to high temperatures, high enough to kill all the microorganisms; this aspect of the invention could be used to re-inoculate the heap after the air and irrigation supply has been restored and resume leaching thereafter. Additionally, this aspect of the invention could be used to re-inoculate old heaps or dumps, leach the heap or dump by methods described previously and extract further values from them.

Because the ability to control aeration and irrigation rates freely during the leach cycle is an important aspect of the invention, it is necessary to ensure that the heap does not become impermeable to air or solution during the leaching process, by for example clogging up with clayish materials. Newmont in U.S. Pat. No. 5,834,294 indicate a method of avoiding the blinding of heaps by the addition of acid resistant polymers to the ore during the agglomeration process prior to leaching. The inventors are of the opinion that such a process may be useful in some cases of application of the invention to avoid such blinding.

A limited bleed of solution (via moisture retained in leached material) takes place in typical heap leaching operations. It is therefore possible that deleterious elements may build up in solution, for example aluminium, as well as organic material from the solvent extraction process. Both organic material and aluminium are known to be toxic to microorganisms. In order to maintain a healthy microbial system, it may be necessary to remove aluminium from solution on a bleed stream of the PLS or raffinate solutions, for example by precipitation, at an elevated pH, with limestone. Organics could be removed by adsorption onto carbon, or biologically using suitable microorganisms. Additionally, any surplus iron or sulphuric acid could also be removed on this stream, by precipitation with limestone for example; pyrite oxidation is likely to increase levels of both. Iron and acid could also be removed by irrigating old heaps, or copper-oxide heaps/dumps, or other basic (alkaline) rock heaps. However, if a low redox system proves to be advantageous, as indicated by Mintek, and mentioned earlier, then some restriction on microbial growth may prove beneficial, reducing the conversion of ferrous to ferric, and keeping the redox relatively low. Such a restriction could be maintained by limiting the bleed from the system. Alternatively, severely restricting the airflow may achieve the same effect. Organic toxicity could be avoided altogether by using ion exchange instead of solvent extraction.

The methods described by Geobiotics, for example in U.S. Pat. No. 6,107,065, in which fines, usually concentrates, are variously coated onto a coarse substrate and heap leached, are also well suited to the invention.

The invention is capable of treating any metal sulphide by oxidation and leaching in heaps, not just copper and nickel. In the case of a pre-treatment process for refractory gold, the invention could be used for controlling heap temperature at a high, and optimum level, by irrigating with cold water rather than raffinate.

The invention can also be used as a means of maintaining heap temperature in the event of rainfall events, normal irrigation ceasing (and restored later on) and the aeration rate adjusted accordingly, retaining heat in the heap; the advection control method will do this automatically.

In the event of temperatures still being too low to achieve chalcopyrite-leaching, oxygen enriched gas could be substituted for air, in order to further reduce cooling at the base of the heap, increasing the average heap temperature. Offgas from thermophile bioleach plants (those using oxygen) and from electrowinning cells would be useful in this regard.

Small quantities of chloride, naturally present in the ore, or added into the system, will enhance the leaching of sulphide minerals.

It will be appreciated by those skilled in the art that the irrigation rates used in the invention are likely to be substantially lower than current industry practice. As a result solution tenor, especially of recovered metal may be somewhat higher on average. However, given the industry practice of recycling PLS back to current heaps to increase copper tenor, on balance, copper solution tenors may be similar to the present art and certainly suitable for processing via solvent extraction and electrowinning. Likewise, it will be appreciated by those skilled in the art that the irrigation applied per tonne of ore will be somewhat lower than present industry practice. Consequently, the Ga/Gl ratios may be deliberately adjusted to produce a more dilute PLS stream at different times in the leach cycle, or to wash out metal values, especially towards the end of the heap life.

To maintain a healthy microbial environment, the microorganisms must have an adequate supply of nutrients. In tank systems processing concentrates, the nutrients are added continuously with the concentrate. However, in the case of heap leaching, nutrients in solid form can only be added once, when the ore is stacked. Such nutrients must be specifically designed for slow release into solution, for the entire duration of the leach cycle. Alternatively, the nutrients can be added with the irrigation solution, although in high heaps in particular, chemistry considerations may make it difficult for nutrients to reach the lower part of the heap. It is also foreseen that nutrients can be added via air addition as an aerosol and/or ammonia gas. Additionally, the microorganisms require a source of carbon for cell growth. Adding carbonates mixed in with the ore heap, or adding in carbon dioxide to the aeration supply can conveniently supply carbon. The amount of carbon and nutrients added is chosen to maintain high rates of microorganism growth and sulphide oxidation. In particular, carbon supply must be adequate when the microbial populations are under establishment at the beginning of the cycle and when temperature shifts into the regions where moderate thermophile microorganisms and thermophile microorganisms become active. Bouffard and Dixon indicate a carbon requirement of about 0.2 g per kg of ore in the bacterial growth phase[5]. Supplementing the air with addition of carbon dioxide gas amounting to between 0 and 5% of the volumetric gas flow, at the appropriate time in the leach cycle, or adding sufficient carbonate to the ore will likely be the best means of meeting this requirement.

Metal can be recovered from solution by means well established in the art, for example by solvent extraction or ion exchange. Gold can be recovered from oxidised gold bearing sulphides by cyanidation.

The invention is further described by way of non-limiting examples with reference to the accompanying drawings, FIGS. 21 to 31, which respectively illustrate different embodiments of the invention.

EXAMPLE 1

Mixed Chalcocite/Chalcopyrite Ore With Accessory Pyrite

Example 1 shows a case where a fixed pad, open lift system is used for the heap leaching process, the site conditions used in the simulation of the control system are those of a Northern Chile winter at an altitude of 3000 m. FIG. 21, on the accompanying drawings, illustrates the first heap of ore 10a placed on a pad 2a, which has been equipped with a drainage system 3a as well as an aeration system 4a. The ore heap 10a is inoculated with suitable microorganisms, as it is stacked, along with at least some sulphuric acid.

The aeration system 4a is fed with ambient air 6a from a variable speed blower 7a. The ore heap 10a has an irrigation system 11a installed, as well as plurality of temperature probes 12a installed over the area of the ore heap 10a in a horizontal grid pattern, these probes are buried beneath the heap surface at a depth of about three meters. An additional temperature probe 35a is installed to measure the PLS temperature. The temperature probes 12a and 35a are connected to a measurement and control system 13a. A plurality of oxygen analyser probes 22a, spaced in a similar manner as the temperature probes 12a, are used to measure the oxygen levels of the gas emerging from just below the surface of the heap 10a and these are also linked to the measurement and control system 13a.

The operation of the measurement and control system 13a is described as follows: The ore heap 10a, that is to be leached, is brought to the take-off point by feeding ambient air 6a into the heap of ore 10a using the blower 7a, via the aeration system 4a. Ambient air 6a is supplied, at a rate, to give a 25% oxygen utilization for the first 100 days, and then 50% oxygen utilization thereafter, by varying the flow rate, according to the oxygen concentration of the gas in the heap, measured by the oxygen analyser probes 22a. The oxygen utilization setpoint is increased during periods of high air flow to reduce the air flow to lower absolute levels, in accordance with the aeration system 4a piping design size, and/or gas pressure. Irrigation solution (raffinate) 15a is fed via the variable speed pump 18a at a fixed ratio to the aeration rate (corresponding to Ga/Gl of 0.2). Before take-off, a determinable temperature rise in PLS temperature can be seen of about 0.2° C. per day. The rate of temperature rise at points about three meters below the surface of the ore heap 10a, is monitored by means of the temperature probes 12a. At some point in time the heap oxidation will take-off and three things happen at that point in time. Firstly, the flow rate of the ambient air 6a increases substantially as a result of the increased oxidation rate, secondly, the PLS temperature drops due to the cooling effect of the additional gas flow, and lastly, the temperature at the point about three meters below surface climbs rapidly to a peak value at a rate of several degrees per day. At this point in time the heap is very close to maximum temperature and has a high upward heat advection. The irrigation solution 15a application rate is increased automatically, still being applied in a fixed ratio to the aeration gas mass flow. The irrigation solution 15a application rate is capped at a maximum design value, although this maximum is not reached in this example. The Ga/Gl ratio can be increased if the rate of temperature decline, about three meters beneath the surface of the heap, becomes excessive, which it does not in this case, due to the-absence of upset conditions in a control system simulation. The absolute addition rate of ambient air 6a continues to be supplied automatically at a rate to give a desired oxygen utilization, by varying the gas flow rate, according to measurements of the oxygen concentration of the gas in the heap, obtained from the of the oxygen analyser probes 22a. Carbon dioxide gas 5a is added to the air 6a feeding into the heap at various points in the leach cycle.

The PLS solution 16a has an average temperature of around 41° C. and an average copper content of 4 g/l, and can be processed using a solvent extraction and electrowinning plant 17a. The irrigation solution (raffinate) 15a is assumed to have cooled to the same temperature as the heap. The raffinate 15a from the plant 17a is fed back to the heaps using a variable speed pump (or other flow controller) 18a. Optionally, a continuous or intermittent bleed stream 19a can be taken from the raffinate stream 15a, and processed in a plant 20a to remove organics, surplus acid, iron, and/or toxic elements. The purified stream 21a can then be reintroduced into the system. Optionally additional acid 23a may be added into the solvent extraction raffinate 15a at any point during the leach cycle. By the end of the leach cycle, other heaps of ore (with new irrigation systems) will, in the meanwhile, been stacked on other areas of the pad, and the process described is then repeated until, eventually, the entire pad area, as envisaged, has a layer of leached ore on top of it. At this point, or somewhat earlier, for some of the time at least, fresh ore will have been placed on top of old leached ore. Since old leached ore heaps will have considerable enthalpy, and such enthalpy can be blown into new ore stacked above it and increase the rate of temperature rise in the new ore. The output of the control system simulation, based on the model described earlier, and other assumptions, is illustrated in FIGS. 22 to 24. The effect of blowing moist air from an old heap (which warms the ore above it) has not been included in these figures, which assumes the ore, the first layer to be leached, is at ambient temperature. The control system simulation period of 750 days does not represent the leach cycle in an actual operation, which would likely terminate at around 500 to 600 days. Additionally the leach period is a function of the mineral leaching rates and activation energies assumed in FIG. 22. If leaching rates were faster, and 90% of the chalcopyrite were to leach in, say, 150 days at 65° C. then the overall leach cycle would be in the order of one year to achieve 90% copper dissolution.

EXAMPLE 2

Chalcopyrite Ore With Accessory Pyrite

Example 2 is the same fixed pad system as Example 1, except that the ore contains chalcopyrite and pyrite and the site conditions used in the control system simulation are those of typical winter conditions in Arizona, USA. The set-up and operation is the same as Example 1, FIG. 21. However, the temperature probes 12a and oxygen probes 22a in this example placed are about one meter deep in the heap. The operation of the control system in this case is different to that in Example 1. Ambient air 6a is supplied at a rate to give a 50% oxygen utilization, by varying the flow rate, according to the oxygen concentration of the gas in the heap, measured by the oxygen analyser probes 22a. The oxygen utilization setpoint is increased to 65% during periods of high air flow to reduce the air flow to lower absolute levels, in accordance with the aeration system 4a piping design size and/or gas pressure. The irrigation rate is varied to maintain a zero net advection coefficient, one meter below the heap surface, automatically keeping the Ga/Gl ratio at an optimum level throughout the leach cycle. The PLS has a similar average temperature to that in Example 1, but the average copper content is somewhat higher at 6 g/l. Again, the irrigation solution (raffinate) 15a is assumed to have cooled to the same temperature as the heap. The output of the control system simulation and other information is illustrated in FIGS. 25 to 27. The control system simulation period of 600 days coincides where the leach cycle may be terminated in an actual operation in this example. The leach period is a function of the mineral leaching rates and activation energies assumed in FIG. 25. If leaching rates were faster, and 90% of the chalcopyrite were to leach in, say, 150 days at 65° C. then the overall leach cycle would be in the order of one year to achieve 93% copper dissolution.

EXAMPLE 3

Chalcocite Ore With Accessory Pyrite

Example 3 is an on-off pad system, and the ore contains chalcocite and pyrite, site conditions for the control simulation are the same as Example 1 as are the set-up and operation shown in FIG. 21. However, the temperature probes 12a and oxygen probes 22a are placed about 1.5 meters deep in the heap, but the control system in this case is similar, but not identical to, that in Example 2. Ambient air 6a is supplied at a rate to give a 25% oxygen utilization, by varying the flow rate, according to the oxygen concentration of the gas in the heap measured by the oxygen analyser probes 22a. The Irrigation rate is varied to maintain a suitable advection coefficient, 1.5 meters below the heap surface, automatically keeping the Ga/Gl ratio at an optimum level throughout the leach cycle. The PLS in this example has an average temperature of 48° C., with an average copper content of 10 g/l. Notwithstanding this, the irrigation solution (raffinate) 15a is assumed to have cooled to the same temperature as the heap. The output of the control system simulation and other assumptions is illustrated in FIGS. 28 to 30.

EXAMPLE 4

Dump Leaching of Chalcopyrite Bearing Waste Rock With Some Pyrite

Example 4 demonstrates application of various aspects of the invention to dump-leaching. FIG. 31 on the accompanying drawings illustrates an ore dump 10c placed on a pad 2c, which has been equipped with a drainage system 3c. The ore dump 10c is inoculated with microorganisms, which have been treated in a plant 4c, which reduces the production of polymeric material on the external surface of their cell walls. The concentrated inoculum is mixed with raffinate 15c and then applied to the dump using the irrigation system 11c; the prepared microorganisms will penetrate the dump and will not stick to the mineral and rock surfaces of the dump, but will slowly re-activate when carbon dioxide from the ambient air 26c and nutrients added via the irrigation system 11c become available to them.

Ambient air 26c enters the dump from many directions and creates an airflow through the dump by natural convection. The dump 10c has an irrigation system 11c installed, as well as plurality of temperature probes 12c installed over the area of the ore heap 10c in a horizontal grid pattern, which are buried beneath the heap surface at a depth of about two meters. An additional temperature probe 35c is installed to measure the PLS temperature. The temperature probes 12c and 35c are connected to a measurement and control system 13c. A plurality of combined oxygen analyser and gas flow measurement probes 22c, spaced in a similar manner as the temperature probes 12c, are used to measure oxygen levels of the gas and the gas flow, within the dump 10c at a depth of about two meters, and these are also linked to the measurement and control system 13c.

The operation of the measurement and control system 13c is described as follows: The irrigation solution 15a is increased automatically, to maintain a net zero advection coefficient at about two meters below the heap surface. In such a manner the heap will be increased in temperature, and the induced gas flow through the heap will increase. Irrigation solution will be further increased or reduced to maintain the advection coefficient set point. As mentioned in the main text, the system may be designed to enable irrigation to be varied independently in different areas on the upper surface of the heap.

The PLS solution 16c can be processed using a solvent extraction and electrowinning plant 17c. The irrigation solution (raffinate) 15c is assumed to have cooled to the same temperature as the heap. The raffinate 15c from the plant 17c is fed back to the heaps using a variable speed pump (or other flow controller) 18c. Optionally a continuous or intermittent bleed stream 19c can be taken from the raffinate stream 15c, and processed in a plant 20c to remove organics, surplus acid, iron and/or toxic elements. The purified stream 21c can then be re-introduced into the system. Optionally, additional acid 23c may be added into the solvent extraction raffinate 15c at any point during the leach cycle.

REFERENCES

1. Colin Hunter, Titan Resources NL, *BioHEAP™ Leaching of a Primary Nickel-Copper Sulphide Ore*, ALTA Cu—Ni Conference, May 2002, Perth, Western Australia.
2. D. G. Dixon, *Analysis of heat conservation during copper sulphide heap leaching*, Hydrometallurgy, 58 (1) (2000) pp. 27-41.
3. D. G. Dixon. *Chalcopyrite Think Tank* 2000. Phelps Dodge Mining Company.
4. www.mmat.ubc.ca/units/bioh/presentations/presentations.htm
4. A. Ian M. Ritchie, *Optimization of Biooxidation Heaps*, Biomining: Theory, Microbes and Industrial Processes, Chapter 10, pp. 210-226, Springer-Verlag New York Inc. (1997).
5. S. C. Bouffard and D. G. Dixon, *On the rate-limiting steps of pyritic refractory gold ore heap leaching: Results from small and large column tests*, Minerals Engineering, Vol. 15, no.11, 2002.

The invention claimed is:

1. A method of controlling a heap leach process through controlling an irrigation rate of a heap as a function of a determination of advection at least at one predetermined point in the heap at or below the heap surface, and controlling an aeration rate of the heap as a function of a determination of the oxidation rate of material within the heap.

2. A method as claimed in claim 1, in which the irrigation rate is also controlled as function of the aeration rate of the heap, and the aeration of the heap is by natural convection.

3. A method as claimed in claim 2 in which the natural convection is at least partly induced.

4. A method as claimed in claim 1 in which the aeration is forced.

5. A method as claimed in claim 1, which includes determining the advection at a point from 0% to 95% of the heap height below the heap surface.

6. A method as claimed in claim 5, which includes determining the advection at a point from 1% to 40% of the heap height below the heap surface.

7. A method as claimed in claim 6, which includes determining the advection at a point from 2% to 30% of the heap height below the heap surface.

8. A method as claimed in claim 1, which includes controlling the aeration rate to maintain a predetermined oxygen utilization of the heap.

9. A method as claimed in claim 8, which includes maintaining the oxygen utilization of the heap in the range of 1% to 99%.

10. A method as claimed in claim 9, which includes maintaining the oxygen utilization of the heap in the range of 15% to 90%.

11. A method as claimed in claim 10, which includes maintaining the oxygen utilization of the heap in the range of 20% to 85%.

12. A method as claimed in claim 1, which includes maintaining the average aeration rate and average irrigation rate at a ratio in the range of 0.125:1 to 5:1.

13. A method as claimed in claim 12, which includes maintaining the average aeration rate and average irrigation rate at a ratio in the range of 0.15:1 to 2:1.

14. A method as claimed in claim 13, which includes maintaining the average aeration rate and average irrigation rate at a ratio in the range of 0.175:1 to 1.5:1.

15. A method as claimed in claim 14, which includes maintaining the average aeration rate and average irrigation rate at a ratio of about 0.2:1.

16. A method as claimed in claim 1, which includes maintaining the instantaneous aeration rate and instantaneous irrigation rate at a ratio in the range of 0:1 to 5:1.

17. A method as claimed in claim 16, which includes maintaining the instantaneous aeration rate and instantaneous irrigation rate at a ratio in the range of 0:1 to 2:1.

18. A method as claimed in claim 17, which includes maintaining the instantaneous aeration rate and instantaneous irrigation rate at a ratio in the range of 0:1 to 1.5:1.

19. A method as claimed in claim 18, which includes maintaining the instantaneous aeration rate and instantaneous irrigation rate at a ratio of about 0.2:1.

20. A method as claimed in claim 1, in which the irrigation rate is also controlled as function of a determination of temperature at least one predetermined point in the heap.

21. A method as claimed in claim 20, which includes determining the temperature at a point from 1% to 95% of the heap height below the heap surface.

22. A method as claimed in claim 21, which includes determining the temperature at a point from 5% to 50% of the heap height below the heap surface.

23. A method as claimed in claim 22, which includes determining the temperature at a point from 10% to 30% of the heap height below the heap surface.

24. A method as claimed in claim 1, in which the temperature determination includes determination of the pregnant leach stream temperature.

25. A method as claimed in claim 1, in which the oxidation rate of sulphide material is determined as a function of any one or more of determinations of the oxygen content of the heap gas, the pregnant leach stream temperature, the heap temperature, the pregnant leach stream metal content, the pregnant leach stream redox value, the pregnant leach stream oxygen concentration, the heap oxygen uptake rate, the heap carbon dioxide uptake rate, simulation based on at least feed composition, sulphide mineral leaching rates, heap geometry, climatic conditions external to the heap, and historical values of previously leached heaps.

26. A method as claimed in claim 25 in which the pregnant leach stream metal content includes recovered metal content.

27. A method of increasing the temperature of heap of material for heap leaching by:
  a) equipping a support surface for the heap with aeration and drainage equipment;
  b) forming a layer of granular material on the support surface,
  c) installing an irrigation system proximate the operatively upper surface of the layer of granular material,
  d) forming a layer of ore on the granular material layer;
  e) passing a hot solution through the granular layer by means of the irrigation system to heat the granular layer,
  f) blowing ambient air through the aeration equipment of the support surface to react with the layer of ore until the temperature of the ore heap reaches a predetermined take-off point,
  g) at least reducing the hot solution irrigation flow of step e) through the granular layer,
  h) introducing irrigation of the ore layer and adjusting the aeration through the aeration equipment until a predeterminable normal optimum heap temperature is reached, and
  i) controlling the heap leaching process according to claim 1.

28. A method as claimed in claim 27, in which step d) includes inoculation of the layer of ore with suitable microorganisms and at least some acid.

29. A method as claimed in claim 27 in which the granular layer is formed from crushed rock.

30. A method as claimed in claim 27 in which the hot solution includes at least one of hot pregnant leach solution, hot solvent extraction raffinate, water, or other fluid.

31. A method as claimed in claim 1 which includes determining an optimum heap configuration for a bio-assisted heap leach process of an ore heap; by measuring the leaching rate, the heat of reaction, and the sulphide content of the ore; and determining maximum aeration and irrigation rates and an optimum heap height.

32. A method as claimed in claim 1 including introduction of microorganisms into the heap of material comprising:
  a) preparing microorganisms substantially without exopolymers on their external cell walls;
  b) adding microorganisms prepared according to step a) to the heap;
  c) at least one of un-assisted or assisted re-activation of the microorganisms in the heap to produce exopolymers on their external cell walls.

33. A method as claimed in claim 32 in which step a) includes exposing the microorganisms to a low nutrient environment or starving the microorganisms.

34. A method as claimed in claim 33 in which the microorganisms are starved by limiting the amount of carbon available to the microorganisms.

35. A method as claimed claim 32 in which step b) includes one or more of adding microorganisms to the heap during formation thereof, drip irrigation of the heap, sprinkling of the heap, and pressurized irrigation of the heap.

36. A method as claimed in claim 32 in which the assisted re-activation comprises exposing the microorganisms to a nutrient rich environment.

37. A method as claimed in claim 36 in which the microorganisms' environment is enriched by means of at least one of:
  a) embedding solid nutrients in the heap;
  b) irrigating the heap with a nutrient rich solution;
  c) aerating the heap with a nutrient rich gas; and
  d) aerating the heap with a gas enriched in carbon dioxide.

38. A method as claimed in claim 37 in which includes the step of embedding a carbon source in the heap.

39. A method as claimed in claim 38 in which the carbon source comprises carbonate.

40. A method as claimed in claims 37 in which the solid nutrients of step a) comprises slow release nutrients.

41. A method as claimed in claim 37 in which the gas of the step c) is enriched with one or more of a nutrient aerosol and ammonia.

42. A method as claimed in claim 32 in which the un-assisted re-activation includes re-activation due to one or more of prevalent conditions in the heap and natural gas flow through the heap.

43. A method as claimed in claim 42 in which the natural gas includes carbon dioxide.

44. A method as claimed in claim 1 which includes the step of enriching the environment of microorganisms embedded in a heap of material for bio-assisted heap leaching by means of:
   a) embedding solid nutrients in the heap;
   b) irrigating the heap with a nutrient rich solution;
   c) aerating the heap with a nutrient rich gas; and
   d) aerating the heap with a gas enriched in carbon dioxide.

45. A method as claimed in claim 44 which includes embedding a carbon source in the heap.

46. A method as claimed in claim 45 in which the carbon source comprises carbonate.

47. A method as claimed in claims 44 in which the solid nutrients of step a) comprises slow release nutrients.

48. A method as claimed in claim 44 in which the gas of the step c) is enriched with one or more of a nutrient aerosol and ammonia.

49. A method as claimed in claims 1 to 4 in which a suiphide fuel material is added to the heap during stacking thereof 50. A method as claimed in claim 49 in which the sulphide fuel includes pyrite or other suitable sulphide concentrate.

51. A method as claimed in claim 32 in which a sulphide fuel material is added to the heap during stacking thereof.

52. A method as claimed in claim 51 in which sulfide fuel includes pyrite or other suitable sulphide concentrate.

53. A method as claimed in claim 1 in which irrigation is applied intermittently.

54. A method as claimed in claim 1 in which aeration is intermittently forced through the heap.

55. A method as claimed in claim 1 in which the heap is divided into at least two zones and the process is at least partly independently controlled in each zone.

\* \* \* \* \*